US010492034B2

(12) United States Patent
Gunasekara et al.

(10) Patent No.: US 10,492,034 B2
(45) Date of Patent: Nov. 26, 2019

(54) APPARATUS AND METHODS FOR DYNAMIC OPEN-ACCESS NETWORKS

(71) Applicant: Time Warner Cable Enterprises LLC, New York, NY (US)

(72) Inventors: Don Gunasekara, Reston, VA (US); Kiran Yeddala, Ashburn, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 575 days.

(21) Appl. No.: 15/063,314

(22) Filed: Mar. 7, 2016

(65) Prior Publication Data
US 2017/0257750 A1    Sep. 7, 2017

(51) Int. Cl.
| H04H 20/71 | (2008.01) |
| H04W 4/06 | (2009.01) |
| H04W 4/02 | (2018.01) |
| H04W 4/90 | (2018.01) |

(52) U.S. Cl.
CPC ............. *H04W 4/06* (2013.01); *H04W 4/02* (2013.01); *H04W 4/90* (2018.02)

(58) Field of Classification Search
CPC combination set(s) only.
See application file for complete search history.

(56) References Cited

U.S. PATENT DOCUMENTS

| 5,313,454 A | 5/1994 | Bustini et al. |
| 5,369,707 A | 11/1994 | Follendore, III |
| 5,528,284 A | 6/1996 | Iwami et al. |
| 5,577,209 A | 11/1996 | Boyle et al. |
| 5,708,961 A | 1/1998 | Hylton et al. |

(Continued)

FOREIGN PATENT DOCUMENTS

| EP | 1139198 A2 | 10/2001 |
| EP | 2113860 A1 | 11/2009 |

(Continued)

OTHER PUBLICATIONS

5C Digital Transmission Content Protection White Paper, Hitachi, Ltd., et al., dated Jul. 14, 1998, 15 pages.

(Continued)

*Primary Examiner* — Abdelillah Elmejjarmi
(74) *Attorney, Agent, or Firm* — Gazdzinski & Associates, PC

(57) ABSTRACT

Apparatus and methods for providing information via an open-access network such as a wireless local area network (WLAN). In one embodiment, the information provided is contextually relevant to one or locations, more users or devices receiving the information. In one implementation, the information is provisioned by a network entity (for example, from a service provider network operator) and provided to one or more access points (APs) of the service provider network. The information is bit-stuffed into Wi-Fi beacon frames or other data structures that are broadcast by the APs to nearby client devices. A receiving client device extracts the information using a protocol embodied in application software on the client, and may also initiate a dedicated wireless connection with the AP for e.g., transmission of content related to the context and/or the bit-stuffed information, access of related Internet addresses, etc.

23 Claims, 18 Drawing Sheets

(56) References Cited

U.S. PATENT DOCUMENTS

| | | |
|---|---|---|
| 5,715,403 A | 2/1998 | Stefik |
| 5,774,170 A | 6/1998 | Hite et al. |
| 5,787,172 A | 7/1998 | Arnold |
| 5,818,438 A | 10/1998 | Howe et al. |
| 5,828,832 A | 10/1998 | Holden et al. |
| 5,862,312 A | 1/1999 | Mann et al. |
| 5,870,474 A | 2/1999 | Wasilewski et al. |
| 5,878,324 A | 3/1999 | Borth et al. |
| 5,897,635 A | 4/1999 | Torres et al. |
| 5,926,205 A | 7/1999 | Krause et al. |
| 5,935,206 A | 8/1999 | Dixon et al. |
| 5,982,412 A | 11/1999 | Nulty |
| 6,002,393 A | 12/1999 | Hite et al. |
| 6,009,103 A | 12/1999 | Woundy |
| 6,092,178 A | 7/2000 | Jindal et al. |
| 6,128,316 A | 10/2000 | Takeda et al. |
| 6,134,532 A | 10/2000 | Lazarus et al. |
| 6,148,400 A | 11/2000 | Arnold |
| 6,154,844 A | 11/2000 | Touboul et al. |
| 6,157,719 A | 12/2000 | Wasilewski et al. |
| 6,167,432 A | 12/2000 | Jiang |
| 6,167,521 A | 12/2000 | Smith et al. |
| 6,169,728 B1 | 1/2001 | Perreault et al. |
| 6,181,697 B1 | 1/2001 | Nurenberg et al. |
| 6,211,901 B1 | 4/2001 | Imajima et al. |
| 6,212,636 B1 | 4/2001 | Boyle et al. |
| 6,219,710 B1 | 4/2001 | Gray et al. |
| 6,219,840 B1 | 4/2001 | Corrigan et al. |
| 6,233,341 B1 | 5/2001 | Riggins |
| 6,233,687 B1 | 5/2001 | White |
| 6,240,553 B1 | 5/2001 | Son et al. |
| 6,249,680 B1 | 6/2001 | Wax et al. |
| 6,256,393 B1 | 7/2001 | Safadi et al. |
| 6,259,701 B1 | 7/2001 | Shur et al. |
| 6,266,421 B1 | 7/2001 | Domyo et al. |
| 6,330,609 B1 | 12/2001 | Garofalakis et al. |
| 6,353,626 B1 | 3/2002 | Sunay et al. |
| 6,378,130 B1 | 4/2002 | Adams |
| 6,434,141 B1 | 8/2002 | Oz et al. |
| 6,456,716 B1 | 9/2002 | Arnold |
| 6,463,585 B1 | 10/2002 | Hendricks et al. |
| 6,498,783 B1 | 12/2002 | Lin |
| 6,519,062 B1 | 2/2003 | Yoo |
| 6,523,696 B1 | 2/2003 | Saito et al. |
| 6,590,865 B1 | 7/2003 | Ibaraki et al. |
| 6,601,171 B1 | 7/2003 | Carter et al. |
| 6,640,145 B2 | 10/2003 | Hoffberg et al. |
| 6,657,991 B1 | 12/2003 | Akgun et al. |
| 6,687,735 B1 | 2/2004 | Logston et al. |
| 6,694,145 B2 | 2/2004 | Riikonen et al. |
| 6,711,148 B1 | 3/2004 | Hills |
| 6,718,551 B1 | 4/2004 | Swix et al. |
| 6,738,978 B1 | 5/2004 | Hendricks et al. |
| 6,742,116 B1 | 5/2004 | Matsui et al. |
| 6,760,768 B2 | 7/2004 | Holden et al. |
| 6,763,391 B1 | 7/2004 | Ludtke |
| 6,782,550 B1 | 8/2004 | Cao |
| 6,785,810 B1 | 8/2004 | Lirov et al. |
| 6,788,676 B2 | 9/2004 | Partanen et al. |
| 6,799,047 B1 | 9/2004 | Bahl et al. |
| 6,807,573 B2 | 10/2004 | Saito et al. |
| 6,813,505 B2 | 11/2004 | Walley et al. |
| 6,842,783 B1 | 1/2005 | Boivie et al. |
| 6,859,535 B1 | 2/2005 | Tatebayashi et al. |
| 6,891,841 B2 | 5/2005 | Leatherbury et al. |
| 6,898,708 B2 | 5/2005 | Hori et al. |
| 6,910,064 B1 | 6/2005 | Astarabadi et al. |
| 6,925,257 B2 | 8/2005 | Yoo |
| 6,944,150 B1 | 9/2005 | McConnell et al. |
| 6,948,183 B1 | 9/2005 | Peterka |
| 6,954,632 B2 | 10/2005 | Kobayashi |
| 6,957,261 B2 | 10/2005 | Lortz |
| 6,957,328 B2 | 10/2005 | Goodman et al. |
| 6,973,576 B2 | 12/2005 | Giobbi |
| 6,975,730 B1 | 12/2005 | Kuroiwa et al. |
| 6,985,355 B2 | 1/2006 | Allirot |
| 6,986,156 B1 | 1/2006 | Rodriguez et al. |
| 6,996,544 B2 | 2/2006 | Sellars et al. |
| 7,006,881 B1 | 2/2006 | Hoffberg et al. |
| 7,007,170 B2 | 2/2006 | Morten |
| 7,009,972 B2 | 3/2006 | Maher et al. |
| 7,016,963 B1 | 3/2006 | Judd et al. |
| 7,017,189 B1 | 3/2006 | DeMello et al. |
| 7,027,460 B2 | 4/2006 | Iyer et al. |
| 7,039,048 B1 | 5/2006 | Monta et al. |
| 7,054,443 B1 | 5/2006 | Jakubowski et al. |
| 7,054,902 B2 | 5/2006 | Toporek et al. |
| 7,055,040 B2 | 5/2006 | Klemba et al. |
| 7,065,216 B1 | 6/2006 | Benaloh et al. |
| 7,068,639 B1 | 6/2006 | Varma et al. |
| 7,069,449 B2 | 6/2006 | Weaver et al. |
| 7,069,573 B1 | 6/2006 | Brooks et al. |
| 7,072,950 B2 | 7/2006 | Toft |
| 7,073,199 B1 | 7/2006 | Raley |
| 7,075,945 B2 | 7/2006 | Arsenault et al. |
| 7,086,077 B2 | 8/2006 | Giammaressi |
| 7,092,397 B1 | 8/2006 | Chandran et al. |
| 7,099,308 B2 | 8/2006 | Merrill et al. |
| 7,103,181 B2 | 9/2006 | Ananth |
| 7,106,382 B2 | 9/2006 | Shiotsu |
| 7,107,326 B1 | 9/2006 | Fijolek et al. |
| 7,143,431 B1 | 11/2006 | Eager et al. |
| 7,149,772 B1 | 12/2006 | Kalavade |
| 7,154,912 B2 | 12/2006 | Chong et al. |
| 7,165,268 B1 | 1/2007 | Moore et al. |
| 7,174,126 B2 | 2/2007 | McElhatten et al. |
| 7,174,127 B2 | 2/2007 | Otten et al. |
| 7,174,371 B2 | 2/2007 | Elo et al. |
| 7,174,385 B2 | 2/2007 | Li |
| 7,194,756 B2 | 3/2007 | Addington et al. |
| 7,209,458 B2 | 4/2007 | Ahvonen et al. |
| 7,225,333 B2 | 5/2007 | Peinado et al. |
| 7,228,427 B2 | 6/2007 | Fransdonk |
| 7,228,555 B2 | 6/2007 | Schlack |
| 7,237,112 B1 | 6/2007 | Ishiguro et al. |
| 7,242,960 B2 | 7/2007 | Van et al. |
| 7,248,694 B2 | 7/2007 | Husemann et al. |
| 7,254,608 B2 | 8/2007 | Yeager et al. |
| 7,257,227 B2 | 8/2007 | Chen et al. |
| 7,266,726 B1 | 9/2007 | Ladd et al. |
| 7,289,534 B1 | 10/2007 | Bailey et al. |
| 7,299,502 B2 | 11/2007 | Schmeling et al. |
| 7,305,460 B2 | 12/2007 | Park |
| 7,308,415 B2 | 12/2007 | Kimbrel et al. |
| 7,313,611 B1 | 12/2007 | Jacobs et al. |
| 7,324,531 B2 | 1/2008 | Cho |
| 7,325,073 B2 | 1/2008 | Shao et al. |
| 7,330,483 B1 | 2/2008 | Peters, Jr. et al. |
| 7,330,967 B1 | 2/2008 | Pujare et al. |
| 7,334,044 B1 | 2/2008 | Allen |
| 7,340,759 B1 | 3/2008 | Rodriguez |
| 7,346,688 B2 | 3/2008 | Allen et al. |
| 7,353,543 B2 | 4/2008 | Ohmori et al. |
| 7,363,371 B2 | 4/2008 | Kirkby et al. |
| 7,373,506 B2 | 5/2008 | Asano et al. |
| 7,376,386 B2 | 5/2008 | Phillips et al. |
| 7,376,976 B2 | 5/2008 | Fierstein et al. |
| 7,379,494 B2 | 5/2008 | Raleigh et al. |
| 7,409,546 B2 | 8/2008 | Platt |
| 7,457,520 B2 | 11/2008 | Rosetti et al. |
| 7,464,179 B2 | 12/2008 | Hodges et al. |
| 7,472,280 B2 | 12/2008 | Giobbi |
| 7,486,869 B2 | 2/2009 | Alexander et al. |
| 7,487,363 B2 | 2/2009 | Alve et al. |
| 7,506,367 B1 | 3/2009 | Ishibashi |
| 7,567,565 B2 | 7/2009 | La |
| 7,577,118 B2 | 8/2009 | Haumonte et al. |
| 7,592,912 B2 | 9/2009 | Hasek et al. |
| 7,602,820 B2 | 10/2009 | Helms et al. |
| 7,673,004 B1 | 3/2010 | Sherstinsky et al. |
| 7,690,020 B2 | 3/2010 | Lebar |
| 7,693,171 B2 | 4/2010 | Gould |
| 7,707,644 B2 | 4/2010 | Choi et al. |
| 7,721,314 B2 | 5/2010 | Sincaglia et al. |

(56) References Cited

U.S. PATENT DOCUMENTS

| | | |
|---|---|---|
| 7,730,321 B2 | 6/2010 | Gasparini et al. |
| 7,742,074 B2 | 6/2010 | Minatogawa |
| 7,752,617 B2 | 7/2010 | Blinick et al. |
| 7,757,101 B2 | 7/2010 | Nonaka et al. |
| 7,783,891 B2 | 8/2010 | Perlin et al. |
| 7,809,942 B2 | 10/2010 | Baran et al. |
| 7,860,507 B2 | 12/2010 | Kalika et al. |
| 7,865,440 B2 | 1/2011 | Jaquette |
| 7,870,599 B2 | 1/2011 | Pemmaraju |
| 7,925,592 B1 | 4/2011 | Issa et al. |
| 7,930,558 B2 | 4/2011 | Hori |
| 7,930,715 B2 | 4/2011 | Hendricks et al. |
| 7,954,131 B2 | 5/2011 | Cholas et al. |
| 7,983,418 B2 | 7/2011 | Oyama et al. |
| 8,041,785 B2 | 10/2011 | Mazur et al. |
| 8,084,792 B2 | 12/2011 | Lehmann et al. |
| 8,166,508 B2 | 4/2012 | Mitsuji et al. |
| 8,181,262 B2 | 5/2012 | Cooper et al. |
| 8,234,387 B2 | 7/2012 | Bradley et al. |
| 8,280,982 B2 | 10/2012 | La et al. |
| 8,306,634 B2 | 11/2012 | Nguyen et al. |
| 8,332,370 B2 | 12/2012 | Gattegno et al. |
| 8,341,242 B2 | 12/2012 | Dillon et al. |
| 8,442,265 B1 | 5/2013 | Bosworth et al. |
| 8,583,484 B1 | 11/2013 | Chalawsky et al. |
| 8,713,623 B2 | 4/2014 | Brooks |
| 8,842,615 B1 | 9/2014 | Kalbag et al. |
| 8,862,155 B2 | 10/2014 | Stern et al. |
| 8,866,911 B1 | 10/2014 | Sivertsen |
| 8,898,270 B1 | 11/2014 | Stack et al. |
| 9,003,436 B2 | 4/2015 | Tidwell et al. |
| 9,027,062 B2 | 5/2015 | Patel et al. |
| 9,071,859 B2 | 6/2015 | Lajoie |
| 9,215,423 B2 | 12/2015 | Kimble et al. |
| 9,300,919 B2 | 3/2016 | Cholas et al. |
| 9,918,345 B2 | 3/2018 | Gunasekara et al. |
| 2001/0004768 A1 | 6/2001 | Hodge et al. |
| 2001/0014946 A1 | 8/2001 | Ichinoi et al. |
| 2001/0019614 A1 | 9/2001 | Madoukh et al. |
| 2001/0029581 A1 | 10/2001 | Knauft |
| 2001/0030785 A1 | 10/2001 | Pangrac et al. |
| 2001/0053223 A1 | 12/2001 | Ishibashi et al. |
| 2001/0053226 A1 | 12/2001 | Akins et al. |
| 2001/0056541 A1 | 12/2001 | Matsuzaki et al. |
| 2002/0013772 A1 | 1/2002 | Peinado |
| 2002/0026575 A1 | 2/2002 | Wheeler et al. |
| 2002/0027883 A1 | 3/2002 | Belaiche |
| 2002/0032754 A1 | 3/2002 | Logston et al. |
| 2002/0049902 A1 | 4/2002 | Rhodes |
| 2002/0054589 A1 | 5/2002 | Ethridge et al. |
| 2002/0055978 A1 | 5/2002 | Joon-Bo et al. |
| 2002/0056125 A1 | 5/2002 | Hodge et al. |
| 2002/0059619 A1 | 5/2002 | Lebar |
| 2002/0062440 A1 | 5/2002 | Akama |
| 2002/0063621 A1 | 5/2002 | Tseng et al. |
| 2002/0066033 A1 | 5/2002 | Dobbins et al. |
| 2002/0077984 A1 | 6/2002 | Ireton |
| 2002/0087976 A1 | 7/2002 | Kaplan et al. |
| 2002/0123928 A1 | 9/2002 | Eldering et al. |
| 2002/0126654 A1 | 9/2002 | Preston et al. |
| 2002/0129358 A1 | 9/2002 | Buehl et al. |
| 2002/0129378 A1 | 9/2002 | Cloonan et al. |
| 2002/0147771 A1 | 10/2002 | Traversat et al. |
| 2002/0152299 A1 | 10/2002 | Traversat et al. |
| 2002/0152393 A1 | 10/2002 | Thoma et al. |
| 2002/0183985 A1 | 12/2002 | Hori et al. |
| 2002/0188744 A1 | 12/2002 | Mani |
| 2002/0188869 A1 | 12/2002 | Patrick |
| 2002/0199105 A1 | 12/2002 | Ishiguro et al. |
| 2003/0002862 A1 | 1/2003 | Rodriguez et al. |
| 2003/0005453 A1 | 1/2003 | Rodriguez et al. |
| 2003/0007516 A1 | 1/2003 | Abramov et al. |
| 2003/0009681 A1 | 1/2003 | Harada et al. |
| 2003/0021421 A1 | 1/2003 | Yokota et al. |
| 2003/0041336 A1 | 2/2003 | Del et al. |
| 2003/0046560 A1 | 3/2003 | Inomata et al. |
| 2003/0046704 A1 | 3/2003 | Laksono et al. |
| 2003/0048380 A1 | 3/2003 | Tamura |
| 2003/0056217 A1 | 3/2003 | Brooks |
| 2003/0061619 A1 | 3/2003 | Giammaressi |
| 2003/0069965 A1 | 4/2003 | Ma et al. |
| 2003/0071117 A1 | 4/2003 | Meade |
| 2003/0074571 A1 | 4/2003 | Fujiwara et al. |
| 2003/0084003 A1 | 5/2003 | Pinkas et al. |
| 2003/0097340 A1 | 5/2003 | Okamoto et al. |
| 2003/0099212 A1 | 5/2003 | Anjum et al. |
| 2003/0114162 A1 | 6/2003 | Chheda et al. |
| 2003/0115267 A1 | 6/2003 | Hinton et al. |
| 2003/0139980 A1 | 7/2003 | Hamilton |
| 2003/0140227 A1 | 7/2003 | Asano et al. |
| 2003/0163697 A1 | 8/2003 | Pabla et al. |
| 2003/0163739 A1 | 8/2003 | Armington et al. |
| 2003/0165241 A1 | 9/2003 | Fransdonk |
| 2003/0166401 A1 | 9/2003 | Combes et al. |
| 2003/0174838 A1 | 9/2003 | Bremer |
| 2003/0179773 A1 | 9/2003 | Mocek et al. |
| 2003/0187799 A1 | 10/2003 | Sellars et al. |
| 2003/0205763 A1 | 11/2003 | Park et al. |
| 2003/0208763 A1 | 11/2003 | McElhatten et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2004/0019691 A1 | 1/2004 | Daymond et al. |
| 2004/0024688 A1 | 2/2004 | Bi et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0078602 A1 | 4/2004 | Rothbarth et al. |
| 2004/0088558 A1 | 5/2004 | Candelore |
| 2004/0106403 A1 | 6/2004 | Mori et al. |
| 2004/0109569 A1 | 6/2004 | Ellison et al. |
| 2004/0117836 A1 | 6/2004 | Karaoguz et al. |
| 2004/0123129 A1 | 6/2004 | Ginter et al. |
| 2004/0128499 A1 | 7/2004 | Peterka et al. |
| 2004/0133907 A1 | 7/2004 | Rodriguez et al. |
| 2004/0133923 A1 | 7/2004 | Watson et al. |
| 2004/0137918 A1 | 7/2004 | Varonen et al. |
| 2004/0146006 A1 | 7/2004 | Jackson |
| 2004/0181800 A1 | 9/2004 | Rakib et al. |
| 2004/0187159 A1 | 9/2004 | Gaydos et al. |
| 2004/0193609 A1 | 9/2004 | Phan et al. |
| 2004/0193680 A1 | 9/2004 | Gibbs et al. |
| 2004/0224425 A1 | 11/2004 | Gjerde et al. |
| 2004/0240478 A1* | 12/2004 | Goren .................. H04J 3/0623 370/503 |
| 2004/0250273 A1 | 12/2004 | Swix et al. |
| 2004/0260798 A1 | 12/2004 | Addington et al. |
| 2004/0261093 A1 | 12/2004 | Rebaud et al. |
| 2004/0268386 A1 | 12/2004 | Logan et al. |
| 2005/0005287 A1 | 1/2005 | Claussen |
| 2005/0007278 A1 | 1/2005 | Anson et al. |
| 2005/0015810 A1 | 1/2005 | Gould et al. |
| 2005/0021985 A1 | 1/2005 | Ono et al. |
| 2005/0022227 A1 | 1/2005 | Shen et al. |
| 2005/0034171 A1 | 2/2005 | Benya |
| 2005/0039205 A1 | 2/2005 | Riedl |
| 2005/0039212 A1 | 2/2005 | Baran et al. |
| 2005/0049886 A1 | 3/2005 | Grannan et al. |
| 2005/0055220 A1 | 3/2005 | Lee et al. |
| 2005/0060742 A1 | 3/2005 | Riedl et al. |
| 2005/0060745 A1 | 3/2005 | Riedl et al. |
| 2005/0065888 A1 | 3/2005 | Benaloh |
| 2005/0086683 A1 | 4/2005 | Meyerson |
| 2005/0086691 A1 | 4/2005 | Dudkiewicz et al. |
| 2005/0091173 A1 | 4/2005 | Alve |
| 2005/0097006 A1 | 5/2005 | Nyako |
| 2005/0108763 A1 | 5/2005 | Baran et al. |
| 2005/0111844 A1 | 5/2005 | Compton et al. |
| 2005/0114686 A1 | 5/2005 | Ball et al. |
| 2005/0114900 A1 | 5/2005 | Ladd et al. |
| 2005/0125832 A1 | 6/2005 | Jost et al. |
| 2005/0138357 A1 | 6/2005 | Swenson et al. |
| 2005/0168323 A1 | 8/2005 | Lenoir et al. |

(56) References Cited

U.S. PATENT DOCUMENTS

| | | |
|---|---|---|
| 2005/0169468 A1 | 8/2005 | Fahrny et al. |
| 2005/0172127 A1 | 8/2005 | Hartung et al. |
| 2005/0176444 A1 | 8/2005 | Tanaka |
| 2005/0177740 A1 | 8/2005 | Athaide et al. |
| 2005/0177741 A1 | 8/2005 | Chen et al. |
| 2005/0177855 A1 | 8/2005 | Maynard et al. |
| 2005/0182931 A1 | 8/2005 | Robert et al. |
| 2005/0188210 A1 | 8/2005 | Perlin et al. |
| 2005/0190912 A1 | 9/2005 | Hopkins et al. |
| 2005/0195975 A1 | 9/2005 | Kawakita |
| 2005/0198693 A1 | 9/2005 | Choi et al. |
| 2005/0268107 A1 | 12/2005 | Harris et al. |
| 2005/0273629 A1 | 12/2005 | Abrams et al. |
| 2005/0278259 A1 | 12/2005 | Gunaseelan et al. |
| 2005/0289618 A1 | 12/2005 | Hardin |
| 2005/0289619 A1 | 12/2005 | Melby |
| 2006/0002551 A1 | 1/2006 | Brown et al. |
| 2006/0004662 A1 | 1/2006 | Nadalin et al. |
| 2006/0008256 A1 | 1/2006 | Khedouri et al. |
| 2006/0020786 A1 | 1/2006 | Helms et al. |
| 2006/0020950 A1 | 1/2006 | Ladd et al. |
| 2006/0021004 A1 | 1/2006 | Moran et al. |
| 2006/0036750 A1 | 2/2006 | Ladd et al. |
| 2006/0041903 A1 | 2/2006 | Kahn et al. |
| 2006/0047801 A1 | 3/2006 | Haag et al. |
| 2006/0047957 A1 | 3/2006 | Helms et al. |
| 2006/0064583 A1 | 3/2006 | Birnbaum et al. |
| 2006/0095940 A1 | 5/2006 | Yearwood |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0137005 A1 | 6/2006 | Park |
| 2006/0137015 A1 | 6/2006 | Fahrny et al. |
| 2006/0148362 A1 | 7/2006 | Bridges |
| 2006/0149850 A1 | 7/2006 | Bowman |
| 2006/0154674 A1 | 7/2006 | Landschaft et al. |
| 2006/0161635 A1 | 7/2006 | Lamkin et al. |
| 2006/0165090 A1 | 7/2006 | Kalliola et al. |
| 2006/0165197 A1 | 7/2006 | Morita et al. |
| 2006/0168219 A1 | 7/2006 | Ahluwalia et al. |
| 2006/0171390 A1 | 8/2006 | La |
| 2006/0171423 A1 | 8/2006 | Helms et al. |
| 2006/0179138 A1 | 8/2006 | Van et al. |
| 2006/0184972 A1 | 8/2006 | Rafey et al. |
| 2006/0187900 A1 | 8/2006 | Akbar |
| 2006/0200856 A1 | 9/2006 | Salowey et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0218604 A1 | 9/2006 | Riedl et al. |
| 2006/0218632 A1 | 9/2006 | Corley et al. |
| 2006/0236131 A1 | 10/2006 | Vauclair |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253864 A1 | 11/2006 | Easty |
| 2006/0259927 A1 | 11/2006 | Acharya et al. |
| 2006/0277569 A1 | 12/2006 | Smith |
| 2006/0291506 A1 | 12/2006 | Cain |
| 2007/0011335 A1 | 1/2007 | Burns et al. |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |
| 2007/0033531 A1 | 2/2007 | Marsh |
| 2007/0046791 A1 | 3/2007 | Wang et al. |
| 2007/0049245 A1 | 3/2007 | Lipman |
| 2007/0067851 A1 | 3/2007 | Fernando et al. |
| 2007/0076728 A1 | 4/2007 | Rieger et al. |
| 2007/0079381 A1 | 4/2007 | Hartung et al. |
| 2007/0089127 A1 | 4/2007 | Flickinger et al. |
| 2007/0094691 A1 | 4/2007 | Gazdzinski |
| 2007/0098178 A1 | 5/2007 | Raikar |
| 2007/0113243 A1 | 5/2007 | Brey |
| 2007/0115900 A1 | 5/2007 | Liang et al. |
| 2007/0121678 A1 | 5/2007 | Brooks et al. |
| 2007/0124488 A1 | 5/2007 | Baum et al. |
| 2007/0157295 A1 | 7/2007 | Mangalore et al. |
| 2007/0174888 A1 | 7/2007 | Rubinstein |
| 2007/0192615 A1 | 8/2007 | Varghese et al. |
| 2007/0195727 A1* | 8/2007 | Kinder ............... H04L 41/00 370/328 |
| 2007/0204314 A1 | 8/2007 | Hasek et al. |
| 2007/0206799 A1 | 9/2007 | Wingert et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0220024 A1 | 9/2007 | Putterman et al. |
| 2007/0233857 A1 | 10/2007 | Cheng et al. |
| 2007/0250872 A1 | 10/2007 | Dua |
| 2007/0250880 A1 | 10/2007 | Hainline |
| 2007/0261116 A1 | 11/2007 | Prafullchandra et al. |
| 2007/0266395 A1 | 11/2007 | Lee et al. |
| 2007/0276925 A1 | 11/2007 | La et al. |
| 2007/0276926 A1 | 11/2007 | LaJoie et al. |
| 2007/0294178 A1 | 12/2007 | Pinder et al. |
| 2008/0008321 A1 | 1/2008 | Gagnon et al. |
| 2008/0008371 A1 | 1/2008 | Woods et al. |
| 2008/0021836 A1 | 1/2008 | Lao |
| 2008/0022012 A1 | 1/2008 | Wang |
| 2008/0037493 A1 | 2/2008 | Morton |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0101460 A1 | 5/2008 | Rodriguez |
| 2008/0103976 A1 | 5/2008 | Read et al. |
| 2008/0103977 A1 | 5/2008 | Khosravy et al. |
| 2008/0104634 A1 | 5/2008 | Gajdos et al. |
| 2008/0109307 A1 | 5/2008 | Ullah |
| 2008/0112405 A1 | 5/2008 | Cholas et al. |
| 2008/0117920 A1 | 5/2008 | Tucker |
| 2008/0123862 A1 | 5/2008 | Rowley |
| 2008/0133551 A1 | 6/2008 | Wensley et al. |
| 2008/0134274 A1 | 6/2008 | Derrenberger et al. |
| 2008/0141317 A1 | 6/2008 | Radloff et al. |
| 2008/0141353 A1 | 6/2008 | Brown |
| 2008/0148362 A1 | 6/2008 | Gilder et al. |
| 2008/0155059 A1 | 6/2008 | Hardin et al. |
| 2008/0155614 A1 | 6/2008 | Cooper et al. |
| 2008/0162353 A1 | 7/2008 | Tom et al. |
| 2008/0165460 A1 | 7/2008 | Whitby-Strevens |
| 2008/0177998 A1 | 7/2008 | Apsangi et al. |
| 2008/0182591 A1 | 7/2008 | Krikorian |
| 2008/0183705 A1 | 7/2008 | Shivaji-Rao et al. |
| 2008/0192820 A1 | 8/2008 | Brooks et al. |
| 2008/0212945 A1 | 9/2008 | Khedouri et al. |
| 2008/0222684 A1 | 9/2008 | Mukraj et al. |
| 2008/0229354 A1 | 9/2008 | Morris et al. |
| 2008/0235746 A1 | 9/2008 | Peters et al. |
| 2008/0244667 A1 | 10/2008 | Osborne |
| 2008/0256510 A1 | 10/2008 | Auerbach |
| 2008/0270307 A1 | 10/2008 | Olson et al. |
| 2008/0273591 A1 | 11/2008 | Brooks et al. |
| 2008/0282299 A1 | 11/2008 | Koat et al. |
| 2008/0288618 A1 | 11/2008 | Vardi et al. |
| 2009/0007234 A1 | 1/2009 | Birger et al. |
| 2009/0013210 A1 | 1/2009 | McIntosh et al. |
| 2009/0025027 A1 | 1/2009 | Craner |
| 2009/0025075 A1 | 1/2009 | Chow et al. |
| 2009/0028182 A1 | 1/2009 | Brooks et al. |
| 2009/0031371 A1 | 1/2009 | Munsell et al. |
| 2009/0064251 A1 | 3/2009 | Savoor et al. |
| 2009/0083813 A1 | 3/2009 | Dolce et al. |
| 2009/0094648 A1* | 4/2009 | Patel ............... H04H 60/51 725/62 |
| 2009/0098861 A1 | 4/2009 | Kalliola et al. |
| 2009/0100459 A1 | 4/2009 | Riedl et al. |
| 2009/0102983 A1 | 4/2009 | Malone et al. |
| 2009/0119751 A1 | 5/2009 | Koga |
| 2009/0125374 A1* | 5/2009 | Deaton ............... G06Q 30/02 705/7.29 |
| 2009/0151006 A1 | 6/2009 | Saeki et al. |

(56) References Cited

U.S. PATENT DOCUMENTS

| | | |
|---|---|---|
| 2009/0170479 A1 | 7/2009 | Jarenskog |
| 2009/0182815 A1 | 7/2009 | Czechowski, III et al. |
| 2009/0185576 A1 | 7/2009 | Kisel et al. |
| 2009/0187939 A1 | 7/2009 | Lajoie |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0244290 A1 | 10/2009 | McKelvey et al. |
| 2009/0265750 A1 | 10/2009 | Jones et al. |
| 2009/0282241 A1 | 11/2009 | Prafullchandra et al. |
| 2009/0282449 A1 | 11/2009 | Lee |
| 2009/0292922 A1 | 11/2009 | Park |
| 2009/0293101 A1 | 11/2009 | Carter et al. |
| 2010/0014496 A1 | 1/2010 | Kalika et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0070867 A1 | 3/2010 | Lemmers |
| 2010/0081416 A1 | 4/2010 | Cohen |
| 2010/0082983 A1 | 4/2010 | Shah et al. |
| 2010/0083329 A1 | 4/2010 | Joyce et al. |
| 2010/0088236 A1 | 4/2010 | Karabulut et al. |
| 2010/0088292 A1 | 4/2010 | Tirpak et al. |
| 2010/0106846 A1 | 4/2010 | Noldus et al. |
| 2010/0122288 A1 | 5/2010 | Minter et al. |
| 2010/0131973 A1 | 5/2010 | Dillon et al. |
| 2010/0138900 A1 | 6/2010 | Peterka et al. |
| 2010/0150027 A1 | 6/2010 | Atwal et al. |
| 2010/0151816 A1 | 6/2010 | Besehanic et al. |
| 2010/0159951 A1 | 6/2010 | Shkedi |
| 2010/0167743 A1 | 7/2010 | Palanki et al. |
| 2010/0169977 A1 | 7/2010 | Dasher et al. |
| 2010/0185855 A1 | 7/2010 | Margolus et al. |
| 2010/0198888 A1 | 8/2010 | Blomstedt et al. |
| 2010/0217837 A1 | 8/2010 | Ansari et al. |
| 2010/0251305 A1 | 9/2010 | Kimble et al. |
| 2010/0287609 A1 | 11/2010 | Gonzalez et al. |
| 2010/0309051 A1 | 12/2010 | Moshfeghi |
| 2010/0312826 A1 | 12/2010 | Sarosi et al. |
| 2010/0313225 A1 | 12/2010 | Cholas et al. |
| 2010/0313226 A1 | 12/2010 | Cholas et al. |
| 2011/0015989 A1 | 1/2011 | Tidwell et al. |
| 2011/0071841 A1 | 3/2011 | Fomenko et al. |
| 2011/0078721 A1 | 3/2011 | Wang et al. |
| 2011/0093900 A1 | 4/2011 | Patel et al. |
| 2011/0103374 A1 | 5/2011 | Lajoie et al. |
| 2011/0107389 A1 | 5/2011 | Chakarapani |
| 2011/0112717 A1 | 5/2011 | Resner |
| 2011/0138064 A1 | 6/2011 | Rieger et al. |
| 2011/0163888 A1 | 7/2011 | Goedde |
| 2011/0164753 A1 | 7/2011 | Dubhashi et al. |
| 2011/0167440 A1 | 7/2011 | Greenfield |
| 2011/0169977 A1 | 7/2011 | Masuda |
| 2011/0197070 A1 | 8/2011 | Mizrah |
| 2011/0206136 A1 | 8/2011 | Bekedam et al. |
| 2011/0213688 A1 | 9/2011 | Santos et al. |
| 2011/0219229 A1 | 9/2011 | Cholas et al. |
| 2011/0225619 A1 | 9/2011 | Kesireddy et al. |
| 2011/0235577 A1 | 9/2011 | Hintermeister et al. |
| 2011/0247029 A1 | 10/2011 | Yarvis et al. |
| 2011/0252236 A1 | 10/2011 | De et al. |
| 2011/0252243 A1 | 10/2011 | Brouwer et al. |
| 2011/0286437 A1 | 11/2011 | Austin et al. |
| 2012/0008786 A1 | 1/2012 | Cronk et al. |
| 2012/0011567 A1 | 1/2012 | Cronk et al. |
| 2012/0023535 A1 | 1/2012 | Brooks et al. |
| 2012/0030716 A1 | 2/2012 | Zhang et al. |
| 2012/0046049 A1 | 2/2012 | Curtis et al. |
| 2012/0054785 A1 | 3/2012 | Yang et al. |
| 2012/0079531 A1* | 3/2012 | Hasek ............... G08B 25/085 725/33 |
| 2012/0079546 A1 | 3/2012 | Kalidindi et al. |
| 2012/0115501 A1 | 5/2012 | Zheng |
| 2012/0151549 A1 | 6/2012 | Kumar et al. |
| 2012/0159603 A1 | 6/2012 | Queck |
| 2012/0167173 A1 | 6/2012 | Nadalin et al. |
| 2012/0202447 A1 | 8/2012 | Edge et al. |
| 2012/0203822 A1 | 8/2012 | Floyd et al. |
| 2012/0222081 A1 | 8/2012 | Schaefer et al. |
| 2012/0278654 A1 | 11/2012 | Shen et al. |
| 2012/0291062 A1 | 11/2012 | Pearson et al. |
| 2012/0302259 A1 | 11/2012 | Busch |
| 2012/0330759 A1 | 12/2012 | Aggarwal et al. |
| 2013/0016648 A1 | 1/2013 | Koskela et al. |
| 2013/0017794 A1 | 1/2013 | Kloper et al. |
| 2013/0045681 A1 | 2/2013 | Dua |
| 2013/0046623 A1 | 2/2013 | Moritz et al. |
| 2013/0081097 A1 | 3/2013 | Park et al. |
| 2013/0095848 A1 | 4/2013 | Gold et al. |
| 2013/0100818 A1 | 4/2013 | Qiu et al. |
| 2013/0132789 A1* | 5/2013 | Watford ............... H04L 1/0041 714/752 |
| 2013/0145152 A1* | 6/2013 | Maino ............... H04L 63/0428 713/156 |
| 2013/0176885 A1 | 7/2013 | Lee et al. |
| 2013/0235774 A1 | 9/2013 | Jo et al. |
| 2013/0254787 A1 | 9/2013 | Cox et al. |
| 2013/0260820 A1 | 10/2013 | Schmandt et al. |
| 2013/0308622 A1 | 11/2013 | Uhlik |
| 2013/0317892 A1* | 11/2013 | Heerboth ............... H04W 88/08 705/14.4 |
| 2013/0347089 A1 | 12/2013 | Bailey et al. |
| 2014/0010219 A1 | 1/2014 | Dor et al. |
| 2014/0046624 A1 | 2/2014 | Miettinen |
| 2014/0066098 A1 | 3/2014 | Stern et al. |
| 2014/0177611 A1* | 6/2014 | Corrales Lopez .... H04W 88/08 370/338 |
| 2014/0213256 A1 | 7/2014 | Meylan et al. |
| 2014/0215506 A1 | 7/2014 | Kalmes et al. |
| 2014/0242991 A1 | 8/2014 | Yanover et al. |
| 2014/0274110 A1* | 9/2014 | Mehta ............... H04W 4/043 455/456.1 |
| 2014/0280901 A1 | 9/2014 | Balachandran et al. |
| 2014/0281489 A1 | 9/2014 | Peterka et al. |
| 2014/0282721 A1 | 9/2014 | Kuncl et al. |
| 2014/0283137 A1 | 9/2014 | Rebaud et al. |
| 2014/0309868 A1 | 10/2014 | Ricci |
| 2014/0328257 A1 | 11/2014 | Kamlani |
| 2014/0359649 A1 | 12/2014 | Cronk et al. |
| 2015/0036514 A1 | 2/2015 | Zhu et al. |
| 2015/0058883 A1 | 2/2015 | Tidwell et al. |
| 2015/0058909 A1 | 2/2015 | Miller et al. |
| 2015/0094098 A1 | 4/2015 | Stern et al. |
| 2015/0103685 A1 | 4/2015 | Butchko et al. |
| 2015/0106501 A1 | 4/2015 | Malets et al. |
| 2015/0106846 A1 | 4/2015 | Chen et al. |
| 2015/0146537 A1 | 5/2015 | Panaitopol et al. |
| 2015/0156129 A1* | 6/2015 | Tsuruoka ............... H04L 47/193 370/235 |
| 2015/0189377 A1 | 7/2015 | Wheatley et al. |
| 2015/0288617 A1 | 10/2015 | Dasher et al. |
| 2015/0288732 A1 | 10/2015 | Phillips et al. |
| 2015/0305082 A1 | 10/2015 | Elliott et al. |
| 2015/0365833 A1 | 12/2015 | Stafford et al. |
| 2016/0019103 A1 | 1/2016 | Basra |
| 2016/0066234 A1* | 3/2016 | Cho ............... H04W 48/18 370/331 |
| 2016/0127185 A1 | 5/2016 | McAllister |
| 2016/0242071 A1 | 8/2016 | Chen et al. |
| 2016/0301525 A1 | 10/2016 | Canard et al. |
| 2017/0099327 A1 | 4/2017 | Negalaguli et al. |
| 2017/0164378 A1 | 6/2017 | Gunasekara |
| 2017/0164416 A1 | 6/2017 | Yeddala |
| 2017/0223536 A1 | 8/2017 | Gupta et al. |
| 2017/0265084 A1 | 9/2017 | Clegg |

FOREIGN PATENT DOCUMENTS

| | | |
|---|---|---|
| GB | 2381709 A | 5/2003 |
| JP | H08263440 A | 10/1996 |
| JP | 2000156676 A | 6/2000 |
| JP | 2000332746 A | 11/2000 |

(56) References Cited

FOREIGN PATENT DOCUMENTS

| | | | |
|---|---|---|---|
| JP | 2001243707 A | 9/2001 |
| JP | 2001274786 A | 10/2001 |
| JP | 2001274788 A | 10/2001 |
| JP | 2001285821 A | 10/2001 |
| JP | 2002163396 A | 6/2002 |
| JP | 2002352094 A | 12/2002 |
| JP | 2003058657 A | 2/2003 |
| JP | 2003162600 A | 6/2003 |
| JP | 2003233690 A | 8/2003 |
| JP | 2003248508 A | 9/2003 |
| JP | 2003296484 A | 10/2003 |
| JP | 2003348508 A | 12/2003 |
| JP | 2004030111 A | 1/2004 |
| JP | 2004072721 A | 3/2004 |
| JP | 2004120736 A | 4/2004 |
| JP | 2004120738 A | 4/2004 |
| JP | 2004303111 A | 10/2004 |
| JP | 2005506627 A | 3/2005 |
| JP | 2005519365 A | 6/2005 |
| JP | 2005519501 A | 6/2005 |
| JP | 2005339093 A | 12/2005 |
| JP | 2006185473 A | 7/2006 |
| JP | 2006311267 A | 11/2006 |
| JP | 2007020144 A | 1/2007 |
| JP | 2008005047 A | 1/2008 |
| JP | 2008015936 A | 1/2008 |
| JP | 2008021293 A | 1/2008 |
| JP | 2008507905 A | 3/2008 |
| JP | 2008167018 A | 7/2008 |
| JP | 2008186272 A | 8/2008 |
| JP | 2008206039 A | 9/2008 |
| JP | 2009071786 A | 4/2009 |
| JP | 2009515238 A | 4/2009 |
| JP | 2009176060 A | 8/2009 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-0103410 A1 | 1/2001 |
| WO | WO-0110125 A1 | 2/2001 |
| WO | WO-0137479 A1 | 5/2001 |
| WO | WO-0169842 A1 | 9/2001 |
| WO | WO-0177778 A2 | 10/2001 |
| WO | WO-0213032 A1 | 2/2002 |
| WO | WO-0221841 A1 | 3/2002 |
| WO | WO-0242966 A1 | 5/2002 |
| WO | WO-02080556 A1 | 10/2002 |
| WO | WO-03038704 A1 | 5/2003 |
| WO | WO-03087799 A1 | 10/2003 |
| WO | WO-03093944 A2 | 11/2003 |
| WO | WO-2004027622 A2 | 4/2004 |
| WO | WO-2005015422 A1 | 2/2005 |
| WO | WO-2006020141 A2 | 2/2006 |
| WO | WO-2008080556 A1 | 7/2008 |
| WO | WO-2009020476 A2 | 2/2009 |
| WO | WO-2012021245 A1 | 2/2012 |

OTHER PUBLICATIONS

Cantor, et al., Assertions and Protocols for the OASIS Security Assertion Markup Language (SAML) V2.0, OASIS Standard, Mar. 15, 2005, Document ID: saml-core-2.0-os (http://docs.oasis-open.org/securit/saml/v2.0/saml-core-2.0-os.pdf).

Cantor, et al., Bindings for the OASIS Security Assertion Markup Language (SAML) V2.0, OASIS Standard, Mar. 2005 (http://docs.oasis-open.org/security/saml/v2.0/).

DCAS Authorized Service Domain, Version 1.2, dated Nov. 30, 2005, 54 pages.

DCAS Licensed Specification Abstracts, CableLabs Confidential Information, Jan. 12, 2006, 4 pages.

Digital Video Broadcasting (DVB); DVB SimulCrypt; Part 1: "Head-end architecture and synchronization" Technical Specification—ETSI TS 101 197 V1,2.1 (Feb. 2002), 40 pages.

DVB (Digital Video Broadcasting), DVB Document A045 Rev. 3, Jul. 2004, "Head-end Implementation of SimulCrypt," 289 pages.

Federal Information Processing Standards Publication, US FIPS PUB 197, Nov. 26, 2001, "Advanced Encryption Standards (AES)," 47 pages.

High-bandwidth Digital Content Protection System, Revision 1.091, dated Apr. 22, 2003, Digital Content Protection LLC Draft, 78 pages.

Marusic, et al., "Share it!—Content Transfer in Home-to-Home Networks." IEEE MELECON 2004, May 12-15, 2004, Dubrovnik, Croatia.

Media Server; 1 Device Template Version 1.01 Jun. 25, 2002.

OpenCable Application Platform Specification, OCAP 2.0 Profile, OC-SP-OCAP2.0-I01-020419, Apr. 19, 2002.

OpenCable Application Platform Specifications, OCAP Extensions, OC-SP-OCAP-HNEXT-I03-080418, 2005-2008.

OpenCable Host Device, Core Functional Requirements, OC-SP-HOST-CFR-I13-030707, Jul. 7, 2003.

OpenCable, HOST-POD Interface Specification, OC-SP-HOSTPOD-IF-I13-030707, Jul. 7, 2003.

OpenCable Specification, Home Networking Protocol 2.0, OC-SP-HNP2.0-I01-08418, 2007.

OpenCable Specifications, Home Networking Security Specification, OC-SP-HN-SEC-DO1-081027, draft (Oct. 27, 2008).

Primergy BX300 Switch Blade user's manual, Fujitsu Corp., Sep. 30, 2002, first edition, pp. 1 to 20.

Real System Media Commerce Suite (Technical White Paper), at http://docs.real.com/docs/drm/DRM.sub-WP1.pdf, 12 pages, Nov. 2001.

Van Moffaert, K., et al. ("Digital Rights Management: DRM is a key enabler for the future growth of the broadband access market and the telecom/networking market in general", Alcatel Telecommunications Review, Alcatel, Paris Cedex FR, Apr. 1, 2003, XP007005930ISSN; 8 pages.

Zhang, et al., A Flexible Content Protection System for Media-on-Demand, ISM China Research Lab, Proceedings of the IEEE Fourth International Symposium on Multimedia Software Engineering (MSE'02), 6 pages.

Deering S.E., "Internet Protocol, Version 6 (IPv6) Specifications," 1998.

Internet Protocol DARPA Internet Program Protocol Spec, 1981.

Gomez, Conserving Transmission Power in Wireless Ad Hoc Networks, 2001, Network Protocols.

Miao, et al., "Distributed interference-aware energy-efficient power optimization," IEEE Transactions on Wireless Communications, Apr. 2011, vol. 10 (4), pp. 1323-1333.

Gupta V., et al., "Bit-Stuffing in 802.11 Beacon Frame: Embedding Non-Standard Custom Information," International Journal of Computer Applications, Feb. 2013, vol. 63 (2), pp. 6-12.

Cisco Intelligent Network Architecture for Digital Video—SCTE Cable-Tec Expo 2004 information page, Orange County Convention Center, Jun. 2004, 24 pages.

Griffith, et al., Resource Planning and Bandwidth Allocation in Hybrid Fiber-Coax Residential Networks, National Institute of Standards and Technology (NIST), 10 pages, no date.

Kanouff, Communications Technology: Next-Generation Bandwidth Management—The Evolution of the Anything-to-Anywhere Network, 8 pages, Apr. 1, 2004.

Motorola DOCSIS Cable Module DCM 2000 specifications, 4 pages, no date.

OpenVision Session Resource Manager—Open Standards-Based Solution Optimizes Network Resources by Dynamically Assigning Bandwidth in the Delivery of Digital Services article, 2 pages, (copyright 2006), (http://www.imake.com/hopenvision).

OpenVision Session Resource Manager features and information, 2 pages, no date, (http://www.imake.com/hopenvision).

* cited by examiner

APPARATUS AND METHODS FOR DYNAMIC OPEN-ACCESS NETWORKS

RELATED APPLICATIONS

The present application is generally related to the subject matter of co-pending and co-owned U.S. patent application Ser. No. 15/002,232 entitled "APPARATUS AND METHOD FOR WIRELESS NETWORK SERVICES IN MOVING VEHICLES" and filed Jan. 20, 2016, Ser. No. 14/959,948 entitled "APPARATUS AND METHOD FOR WIRELESS NETWORK EXTENSIBILITY AND ENHANCEMENT" and filed Dec. 4, 2015, Ser. No. 14/534, 067 filed Nov. 5, 2014 and entitled "METHODS AND APPARATUS FOR DETERMINING AN OPTIMIZED WIRELESS INTERFACE INSTALLATION CONFIGURATION", and Ser. No. 14/302,313 filed Jun. 11, 2014 and entitled "METHODS AND APPARATUS FOR ACCESS POINT LOCATION" each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of wireless networks, and specifically in one or more embodiments, to apparatus and methods for enabling a wireless access point to host, exchange, and transfer data to/from other wireless devices, such as mobile client devices. Other various disclosed embodiments provide practical commercial uses and network services.

2. Description of Related Technology

Wireless networking technologies enable wireless devices to connect to one another. One common application for wireless technology is to provide network access to devices that are within a coverage area of a wireless network that is connected to the Internet. One such technology is Wi-Fi® (IEEE Std. 802.11), which has become the de facto standard for wireless networking in consumer electronics. Wi-Fi enables multiple interconnected access points (APs, also colloquially referred to as "hotspots") to provide coverage areas ranging from those as small as local establishments (such as stores or coffee shops) or residences, to entire corporate and academic campuses.

Typical wireless APs have an effective connectivity range on the order of one hundred (100) feet, depending on factors such as the presence or absence of buildings or other structures (and their materials of construction), and other interfering emitters. Although large coverage areas can be formed by grouping together a number of APs with overlapping coverage, individual (or grouped) wireless APs may provide opportunities to deliver unique or tailored services or information of particular interest to clientele by virtue of their limited range.

Commercially, Wi-Fi provides high-value services to consumers in establishments outside of home, for example, airports, hotels, and restaurants. Businesses and/or promotional events often provide Internet service as a way to attract customers. Today, consumers of all ages have access to the Internet on, e.g., mobile devices; however, mobile devices remain a largely untapped source of nurturing a relationship for potential business "in the moment", or in the future. For example, public environments usually lack ready means for electronic dialogue with potential clientele e.g., via their mobile devices. Instead, most businesses use traditional solutions for outreach, such as sending emails, contextual or other Internet advertising, distributing flyers, making radio, podcast, etc. announcements.

One problem with using Wi-Fi (or other wireless technologies) for initiating the aforementioned consumer dialogues, is that Wi-Fi connectivity has a cumbersome process to establish a Wi-Fi connection to deliver information (e.g., advertisements, emails). More pointedly, typical APs burden businesses and customers with unnecessary information, risks, and/or manual steps for connection, which may prevent potentially positive or profitable interaction between a business and a customer. Such burdens include e.g., difficulty in identifying the correct Wi-Fi AP from multiple available networks, password based access, exposure of sensitive information on a "public" network, or even forcing unwanted advertisements or other content to a customer before a connection is offered (so as to offset costs). Additionally, the users or devices may not know that certain functions are or are not supported by the Wi-Fi AP until a connection is established (i.e., there is limited visibility by the user or device into available functions or content prior to connection).

To these ends, improved methods and apparatus are needed to foster a more direct and dynamic way to communicate with consumers via ubiquitous client devices, e.g., smartphones, tablets, laptops, or even their vehicles (e.g., a vehicle equipped with Wi-Fi) by way of existing AP infrastructure, e.g., routers, modems, and hotspots associated with public establishments. Hence, solutions are needed to provide an open-access network that can automatically start an electronic dialogue between a client device and an AP.

SUMMARY

The present disclosure addresses the foregoing needs by providing, inter alia, methods and apparatus for providing dynamic open-access networks.

In one aspect of the present disclosure, a method of providing a dynamic open-access network to at least one client device is provided. In one embodiment, the method includes: receiving information; packaging at least a portion of the information related to the proximate context into a plurality of data structures (e.g., Wi-Fi beacons); and broadcasting the plurality of structures comprising the at least the portion of the information. In one variant, the information includes information related to a proximate context (e.g., for the transmitting device, receiving device, or user of the receiving device).

In another aspect of the present disclosure, a method of participating in a dynamic open-access network is provided. In one embodiment, the method includes: receiving and acknowledging one or more data structures (e.g., beacons) comprising information that is contextually relevant to a client device, when the client device is located within a range of an access point; assembling the one or more data structures; identifying the contextually relevant information;

and when the contextually relevant information is identified, performing an action related to a context.

In another aspect, an apparatus for use within a dynamic open-access network is provided. In one embodiment, the apparatus includes: a processor in data communication with one or more network interfaces; and a non-transitory computer-readable storage apparatus in data communication with the processor and comprising one or more computer programs, the one or more computer programs comprising a plurality of instructions. In one variant, the instructions are configured to, when executed on the processor: receive at least information associated with one or more proximate contexts; embed at least the information associated with the proximate context (s) into one or more data structures (e.g., beacons); and transmit the one or more data structures via the one or more network interfaces. In one implementation, the proximate context(s) is/are related to at least one event within a range of connectivity of the apparatus.

In another aspect, a system for use within a wireless open-access network is provided. In one embodiment, the system comprises a cloud-based controller in operative communication with one or more wireless access points disposed at various locations. The controller is managed by a service provider network operator (e.g., cable or satellite MSO), and configured to coordinate delivery of information to the various delivery nodes (e.g., Wi-Fi APs) based on local and/or broader network contexts and considerations.

In a further aspect, a non-transitory computer-readable apparatus is disclosed. In one embodiment, the apparatus includes a storage medium having at least one computer program disposed thereon, the at least one computer program configured to, when executed, implement dynamic open wireless network access for one or more proximate client devices. In one variant, the at least one computer program is rendered as an application program ("app") downloadable to a user mobile device and compatible with the operating system thereof; the app enables the mobile device to extract information from "open network" beacons or other data structures for use (e.g., display, storage, later transmission). In one variant, the app comprises a virtual wallet wherein virtual coupons, rewards, points, currency, etc. can be stored and later negotiated with e.g., merchants, such as for goods or services.

In a further aspect an application programming interface (API) useful with a mobile wireless device is disclosed. In one embodiment, the API comprises an interface that can be called by e.g., an app on the mobile device in order to access "bit-stuffed" beacon data received via the 802.11 interface of the mobile device.

In another aspect, a method of utilizing Wi-Fi probe requests and probe responses for communication of open network content is disclosed.

In yet a further aspect, a wireless-enabled client device is disclosed. In one embodiment, the client device comprises a Wi-Fi-enabled smartphone or tablet or laptop computer with an application program operative to run thereon. The application computer program is configured to enable the device to extract data from one or more data structures (e.g., Wi-Fi AP beacons, probe requests, or probe responses) received by the Wi-Fi interface of the device, and render the extracted data in a useful form; e.g., for display and/or audio playout on the client device. In another embodiment, the application program comprises computerized logic configured to enable the client device to selectively (and even autonomously) determine the relevance or suitability of extracted data for the client device/user thereof, such as based on geographic location/context.

These and other aspects shall become apparent when considered in light of the disclosure provided herein.

Figure 1:
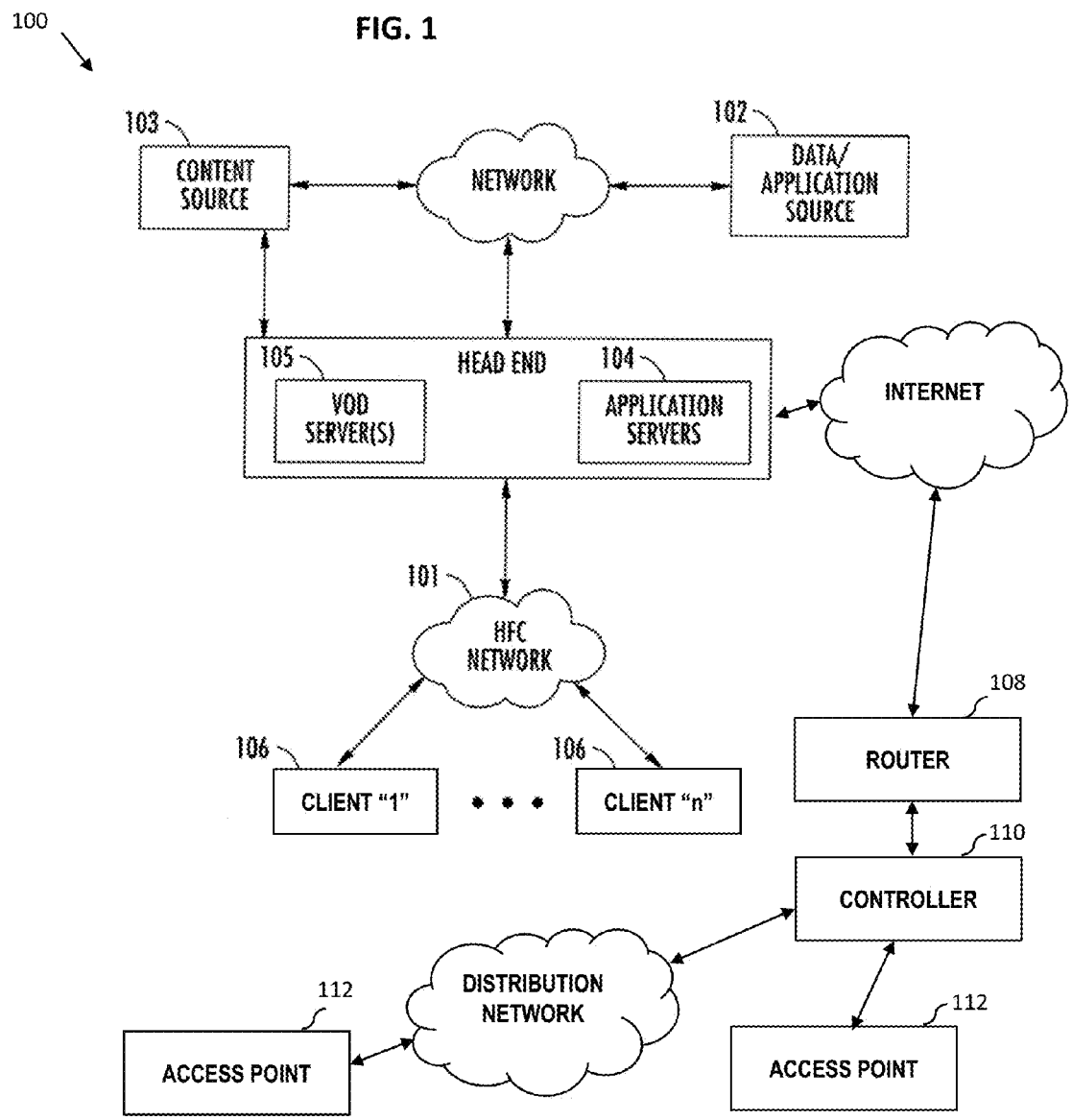
FIG. 1 is a functional block diagram illustrating an exemplary hybrid fiber network configuration useful with various aspects of the present disclosure.

All figures © Copyright 2015-2016 Time Warner Enterprises LLC. All rights reserved.

DETAILED DESCRIPTION

Reference is now made to the drawings wherein like numerals refer to like parts throughout.

As used herein, the term "access point" refers generally and without limitation to a network node which enables communication between a user or client device and another entity within a network, such as for example a Wi-Fi AP, or a Wi-Fi-Direct enabled device acting as a Group Owner (GO).

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment or similar systems.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the terms "context" or "contextually" refer without limitation to an environment and/or circumstance of the access point and/or client device. Common examples of context include: one or more events, geographic or spatial contexts, service availability, relation to other types of content, and/or characteristics of an area or establishment (which may be e.g., commercial, military, government, academic, etc.) associated with an access point or service node from which a client device may receive information. A context may be associated with information that is relevant to users of a client device, who may consume or interact with the environment or circumstance based on the contextual information.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE-Std. 802.11 or related standards including 802.11 a/b/g/n/s/v/ac or 802.11-2012/2013, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

In an exemplary embodiment of the present disclosure, an open-access network is configured to provide simple and instantaneous delivery of data wirelessly to a nearby client device (e.g., smartphones, laptops, tablets, mobile devices, vehicles and the like). The data may be received from e.g., a centralized control manager at an access point (e.g., a WLAN AP), and may also be transmitted through an intermediary entity (e.g., at least one AP controller). It may also be generated locally via an AP (or its controller), or even another client. The data includes for example information of interest to the device or a user thereof, such as: promotions from a nearby store (e.g., advertisements, offers, and/or discount coupons, etc.); roaming engagements; location information, e.g., directions to a particular location (e.g., via maps, and in some cases avoiding triangulation and/or GPS usage, etc.); information relating to services on-demand (e.g., streaming); and/or network parameters, addresses, and capabilities of nearby APs enabling the device to select a connection likely to provide a better user experience.

In one variant, the data is selected to be relevant to one or more contexts (e.g., geography, demographics or psychographics of the user, hardware/software platform, etc.), such data being dynamically and intelligently selected and delivered to client devices and users within range of the AP(s) (or other network entities) that serve the information. For example, information retained in a service provider's client or subscriber database can be used by the exemplary processes described herein to dynamically customize or tailor content delivery and experience via the AP(s) in order to enhance relevance or utility to the subscriber, all in a completely "open" fashion.

In one exemplary embodiment, the contextually relevant information is embedded into one or more Wi-Fi beacons, via a bit stuffing process. Beacons have sufficient capacity to include small data, such as a service set identifier (SSID), medium access control (MAC) header, metadata, and the like. Furthermore, if/when a dedicated connection is established, the AP may enable further delivery of more "data heavy" content, such as video files, games, audio, books, etc., via the direct connection.

Other examples of actions which may be taken once a connection is established include e.g., handovers between APs, enhancement of the network by extending network coverage of an AP via other APs, and even peer-to-peer connections between client devices (such as via so-called "Wi-Fi Direct" or similar protocols).

The AP periodically broadcasts the beacons including the information received from the centralized manager (received via its AP controller). Client devices within range of the coverage of the AP may then receive the beacons. Client devices that have an enabled client application (e.g., a downloadable software application from and/or associated with the service provider, network and/or infrastructure), may then unpack and/or decode the received beacons. The client application may further enable the client device to rearrange, decrypt, or otherwise coordinate the received beacons using a common protocol used within the network (and disseminated via e.g., the centralized manager, AP(s), data center(s), and/or AP controller(s)).

In one variant, the management of various supported protocols is managed by a discrete beacon manager process within the AP (and a corresponding application program in the client device). The AP and/or client devices may also have the capacity to protect the beacons via user authentication, data encryption, or other means of access control.

In another peer-based embodiment, probe requests and/or responses transacted between two or more "Wi-Fi Direct" enabled clients can be "stuffed", as can the beacons ultimately issued by the "group owner" or GO in such transactions, so as to obviate the need for any AP or centralized controller.

Various other embodiments of the disclosed open-access networks expand upon the capabilities of current networks by providing efficient access to information in a convenient, non-intrusive manner, and contextually responsive.

Detailed Description of Exemplary Embodiments

Exemplary embodiments of the apparatus and methods of the present disclosure are now described in detail. While these exemplary embodiments are described in the context of the previously mentioned Wi-Fi WLAN(s) associated with a managed network (e.g., hybrid fiber coax (HFC) cable architecture having a multiple systems operator (MSO), digital networking capability, IP delivery capability, and a plurality of client devices), the general principles and advantages of the disclosure may be extended to other types of networks and architectures that are configured to deliver digital media data (e.g., text, images, video, and/or audio). Such other networks or architectures may be broadband, narrowband, wired or wireless, or otherwise, the following therefore being merely exemplary in nature.

It will also be appreciated that while described generally in the context of a network providing service to commercial/retail or enterprise domain (e.g., businesses), the present disclosure may be readily adapted to other types of environments including, e.g., a customer or consumer or end user (i.e., residential), and government/military applications. Myriad other applications are possible.

Also, while certain aspects are described primarily in the context of the well-known Internet Protocol (described in, inter alia, *Internet Protocol DARPA Internet Program Protocol Specification*, IETF RCF 791 (September 1981) and Deering et al., *Internet Protocol, Version 6 (Ipv6) Specification*, IETF RFC 2460 (December 1998), each of which is incorporated herein by reference in its entirety), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Service Provider Network—

FIG. 1 illustrates a typical service provider network configuration useful with the features of the wireless network described herein. This service provider network 100 is used in one embodiment of the disclosure to provide backbone and Internet access from the service provider's wireless access points (e.g., Wi-Fi APs operated or maintained by the service provider or its customers/subscribers), or even third party access points accessible to the service provider via e.g., an interposed network such as the Internet (e.g., with appropriate permissions from the access point owner/operator/user).

As opposed to an unmanaged network, the managed service-provider network of FIG. 1 advantageously allows, inter alia, control and management of a given user's access (such user which may be a network subscriber, or merely an incidental/opportunistic user of the service) via the wireless access point(s), including imposition and/or reconfiguration of various access "rules" or other configurations applied to the wireless access points. As but one example, the wireless access points (see discussion of FIG. 1a infra) disposed at the service location(s) can be coupled to the bearer managed network (FIG. 1) via e.g., a cable modem termination system (CMTS) and associated local DOCSIS modem, a wireless bearer medium (e.g., an 802.16 WiMAX system), a fiber-based system such as FiOS or similar, a third-party medium which the managed network operator has access to (which may include any of the foregoing), or yet other means.

Advantageously, the service provider network 100 also allows components at the service location (e.g., Wi-Fi APs and any supporting infrastructure such as routers, switches, etc.) to be remotely reconfigured by the network MSO, based on e.g., prevailing operational conditions in the network, changes in user population and/or makeup of users at the service location, business models (e.g., to maximize profitability), etc. In certain embodiments, the service provider network also advantageously permits the aggregation and/or analysis of subscriber- or account-specific data (including inter alia, particular mobile devices associated with such subscriber or accounts) as part of the provision of services to users under the exemplary delivery models described herein.

The various components of the exemplary embodiment of the network 100 include (i) one or more data and application origination sources 102; (ii) one or more content sources 103, (iii) one or more application distribution servers 104; (iv) one or more VOD servers 105, and (v) client devices and/or Customer Premises Equipment (CPE) 106, (vi) one or more routers 108, (vii) one or more wireless access point controllers 110, and/or (viii) one or more access points 112. The distribution server(s) 104, VOD servers 105 and CPE/client device(s) 106 are connected via a bearer (e.g., HFC) network 101. A simple architecture comprising one of each of certain components 102, 103, 104, 105, 108, 110 is shown in FIG. 1 for simplicity, although it will be recognized that comparable architectures with multiple origination sources, distribution servers, VOD servers, controllers, and/or client devices (as well as different network topologies) may be utilized consistent with the present disclosure. For example, the headend architecture of FIG. 1a (described in greater detail below), or others, may be used.

Figure 1A:
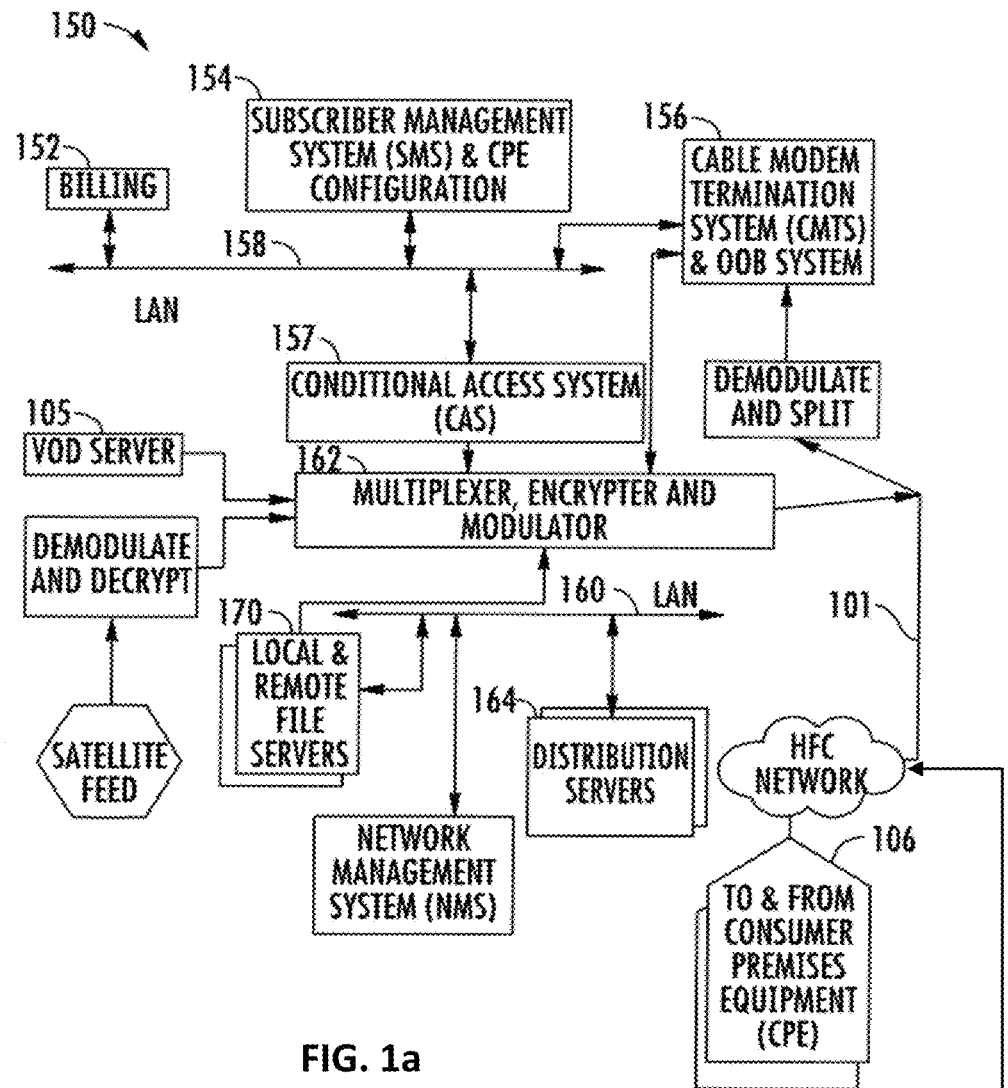
FIG. 1a is a functional block diagram illustrating one exemplary network headend configuration useful with various aspects of the present disclosure.

FIG. 1a shows one exemplary embodiment of a headend architecture. As shown in FIG. 1a, the headend architecture 150 comprises typical headend components and services including billing module 152, subscriber management system (SMS) and client/CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the disclosure. It will also be appreciated that the headend configuration depicted in FIG. 1a is high-level, conceptual architecture, and that each MSO may have multiple headends deployed using custom architectures.

Figure 1B:
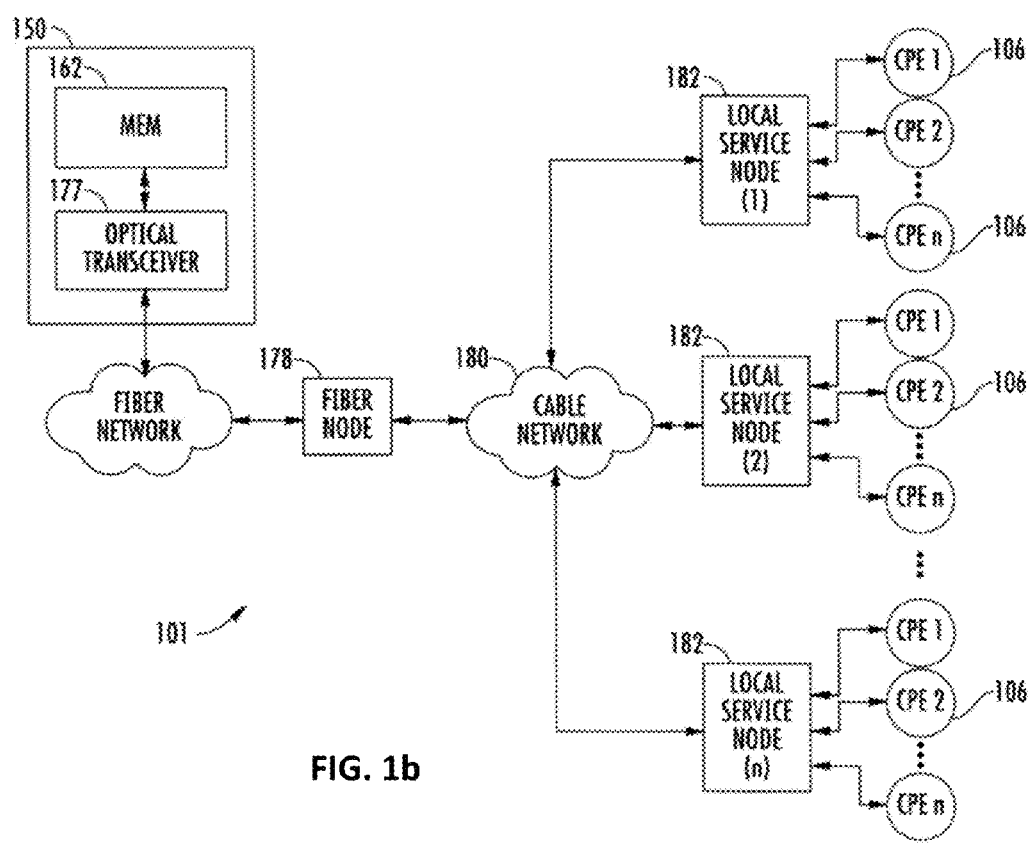
FIG. 1b is a functional block diagram illustrating one exemplary local service node configuration useful with various aspects of the present disclosure.

The exemplary architecture 150 of FIG. 1a further includes a conditional access system (CAS) 157 and a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the client devices/CPE 106 ("downstream") are multiplexed together in the headend, as previously described and sent to neighborhood hubs (as shown in the exemplary scheme of FIG. 1b) via a variety of interposed network components.

Content (e.g., audio, video, data, files, etc.) is provided in each downstream (in-band) channel associated with the relevant service group. To communicate with the headend or intermediary node (e.g., hub server), the client devices/CPE 106 may use the out-of-band (OOB) or DOCSIS channels and associated protocols. The OCAP 1.0, 2.0, 3.0, 3.1 (and subsequent) specification provides for exemplary networking protocols both downstream and upstream, although the present disclosure is in no way limited to these approaches.

Figure 1C:
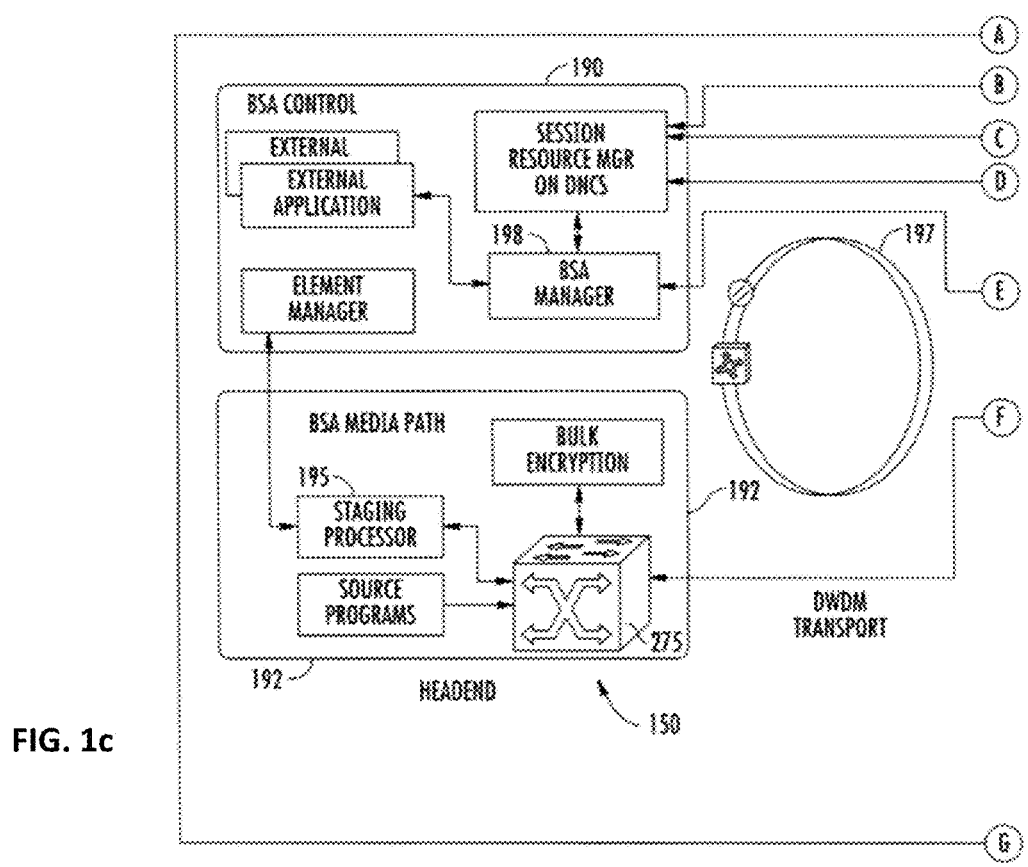
FIG. 1c is a functional block diagram illustrating one exemplary broadcast switched architecture (BSA) network useful with various aspects of the present disclosure.
Figure 1C:
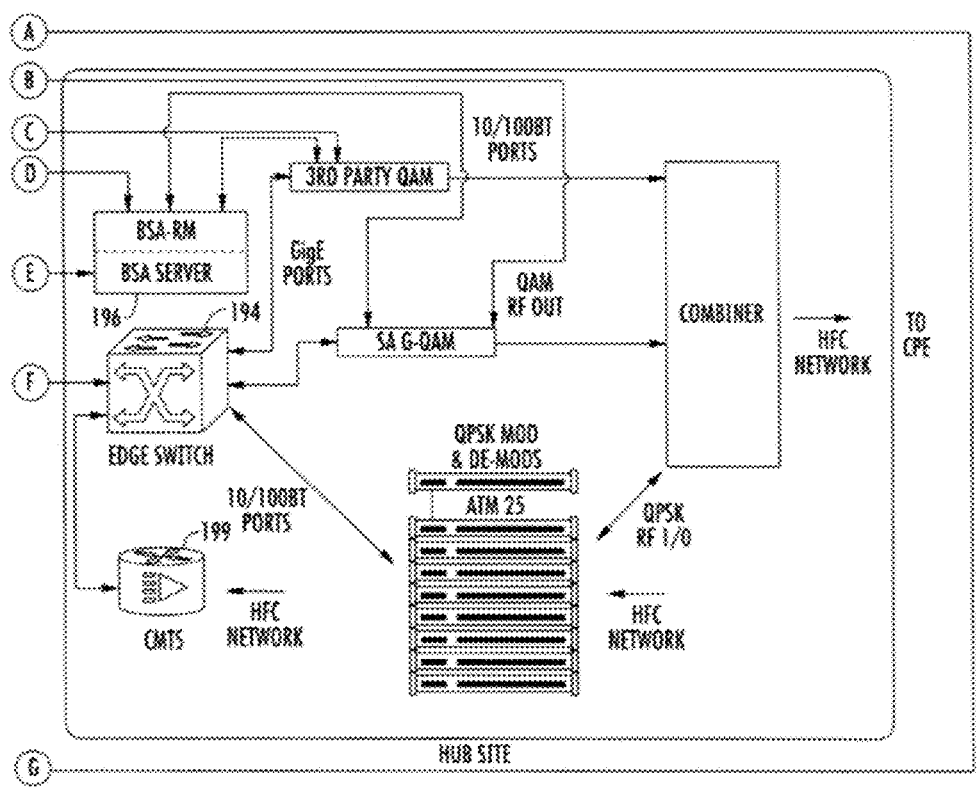

FIG. 1c illustrates an exemplary "switched" network architecture which may be used consistent with the present disclosure for, inter alia, provision of services to the wireless access points of interest. Specifically, the headend 150 contains switched broadcast control 190 and media path functions 192; these element cooperating to control and feed, respectively, downstream or edge switching devices 194 at the hub site which are used to selectively switch broadcast streams to various service groups. Broadcast switched architecture (BSA) media path 192 may include a staging processor 195, source programs, and bulk encryption in communication with a switch 275. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

In addition to "broadcast" content (e.g., video programming), the systems of FIGS. 1a and 1c (and 1d discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1c, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets received from the CMTS 199 to the QAM modulator, which transmits the packets on one or more physical (QAM-modulated RF) channels to the CPE/client devices. The IP packets are typically transmitted on RF channels (e.g., DOCSIS QAMs) that are different that the RF channels used for the broadcast video and audio programming, although this is not a requirement. The client devices/CPE 106 are each configured to monitor the particular assigned RF channel (such as via a port or socket ID/address, or other such mechanism) for IP packets intended for the subscriber premises/address that they serve. For example, in one embodiment, a business customer premises obtains its Internet access (such as for a connected Wi-Fi AP) via a DOCSIS cable modem or other device capable of utilizing the cable "drop" to the premises (e.g., a premises gateway, etc.).

Figure 1D:
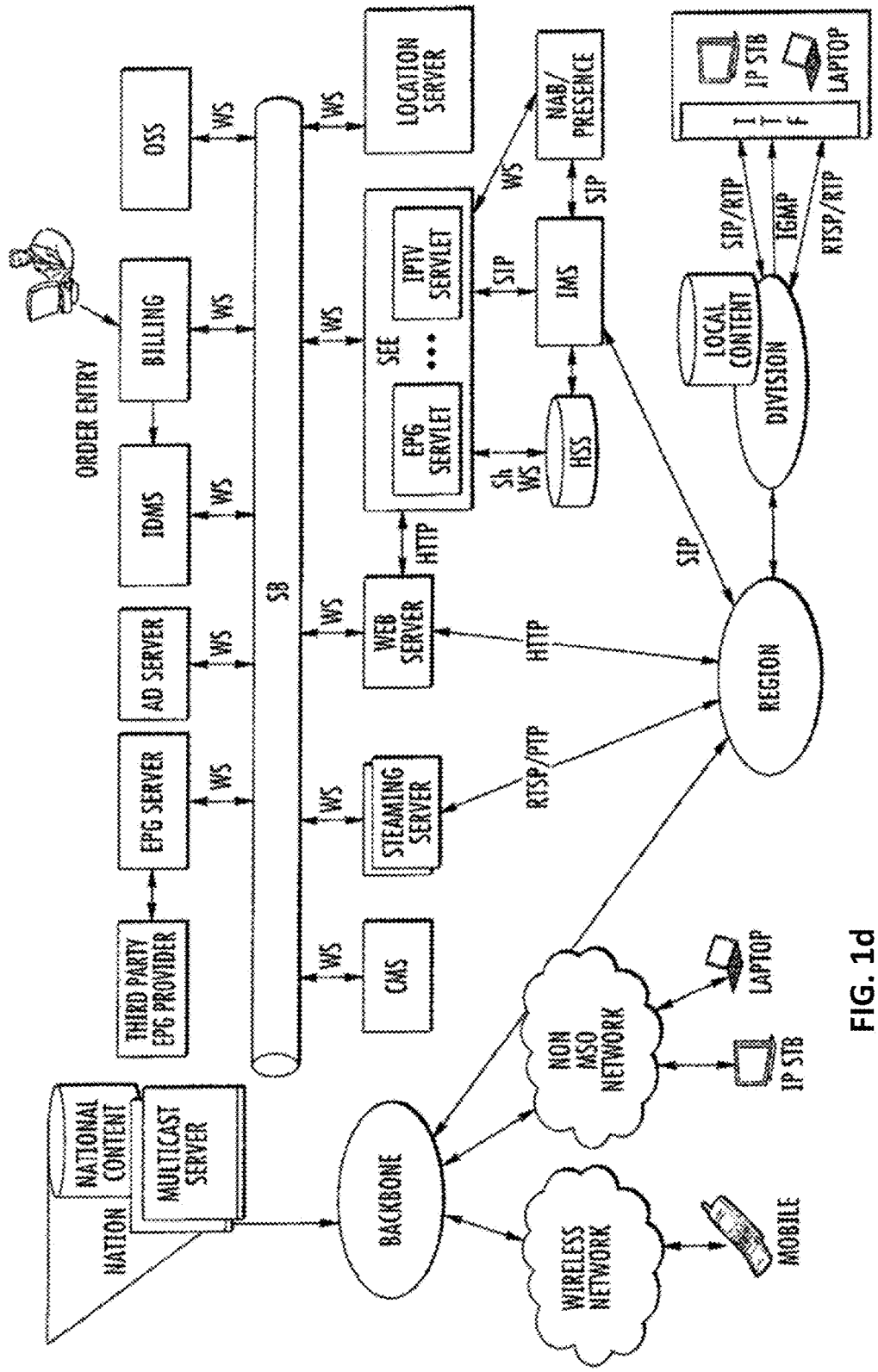
FIG. 1d is a functional block diagram illustrating one exemplary packetized content delivery network architecture useful with various aspects of the present disclosure.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the disclosure, a "packet optimized" delivery network is used for carriage of the packet content (e.g., Internet data, IPTV content, etc.). FIG. 1d illustrates one exemplary implementation of such a network, in the context of a 3GPP IMS (IP Multimedia Subsystem) network with common control plane and service delivery platform (SDP), as described in co-owned and co-pending U.S. patent application Ser. No. 12/764,746 filed Apr. 21, 2010 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title, incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the other foregoing architectures.

It will be appreciated that the foregoing MSO or managed network can advantageously be leveraged for easy installation of the various APs (and/or any lower-level "children APs" as described in co-owned and co-pending U.S. patent application Ser. No. 15/002,232 entitled "APPARATUS AND METHOD FOR WIRELESS NETWORK SERVICES IN MOVING VEHICLES" and filed Jan. 20, 2016, incorporated herein by reference in its entirety) within a geographic region. Consider, for example, a MSO network that is already pervasive throughout a given area (i.e., the MSO has numerous customers, both business and residential and otherwise); in such networks, the MSO already has significant infrastructure deployed, at a very high level of granularity. Hence, if an AP needs to be placed at a given location in order to effect the coverage/operation for the Wi-Fi network described herein, the MSO can easily "tap off" the existing infrastructure in that area to enable the AP placement. This may take the form of e.g., placement of an AP coincident with a given customer's extant equipment, and/or placement of new equipment that taps off a local service node. The present disclosure further contemplates provision by the MSO (or other parties) of consideration to the customer for allowing the placement of the equipment on their premises (e.g., payments, credits on their bill, special services or features, etc.).

It is also contemplated that the service provider may utilize or "piggyback" off the infrastructure of other service providers, utilities, etc. For instance, a third party service provider may have a high-bandwidth backhaul "drop" near a location desired by the MSO; the MSO can then lease, pay, rent, etc. that third party for use of the drop. Similarly, traffic signal poles, lighting, bridges, tunnels, etc. all contain a wide variety of cabling, conduits, and other infrastructure which the (host) MSO could make use of so as to obviate having to perform a new installation (and all of the attendant costs and delays thereof). Hence, consumers' ubiquitous access to the Internet via e.g., APs existing or installed within an existing infrastructure and/or other means described herein, can provide additional opportunities for businesses and other entities to communicate with or expand their reach to consumer devices, while advantageously reducing the workload on the network backend (e.g., centralized server).

Bit Stuffing Beacon Frames—

Figure 2:
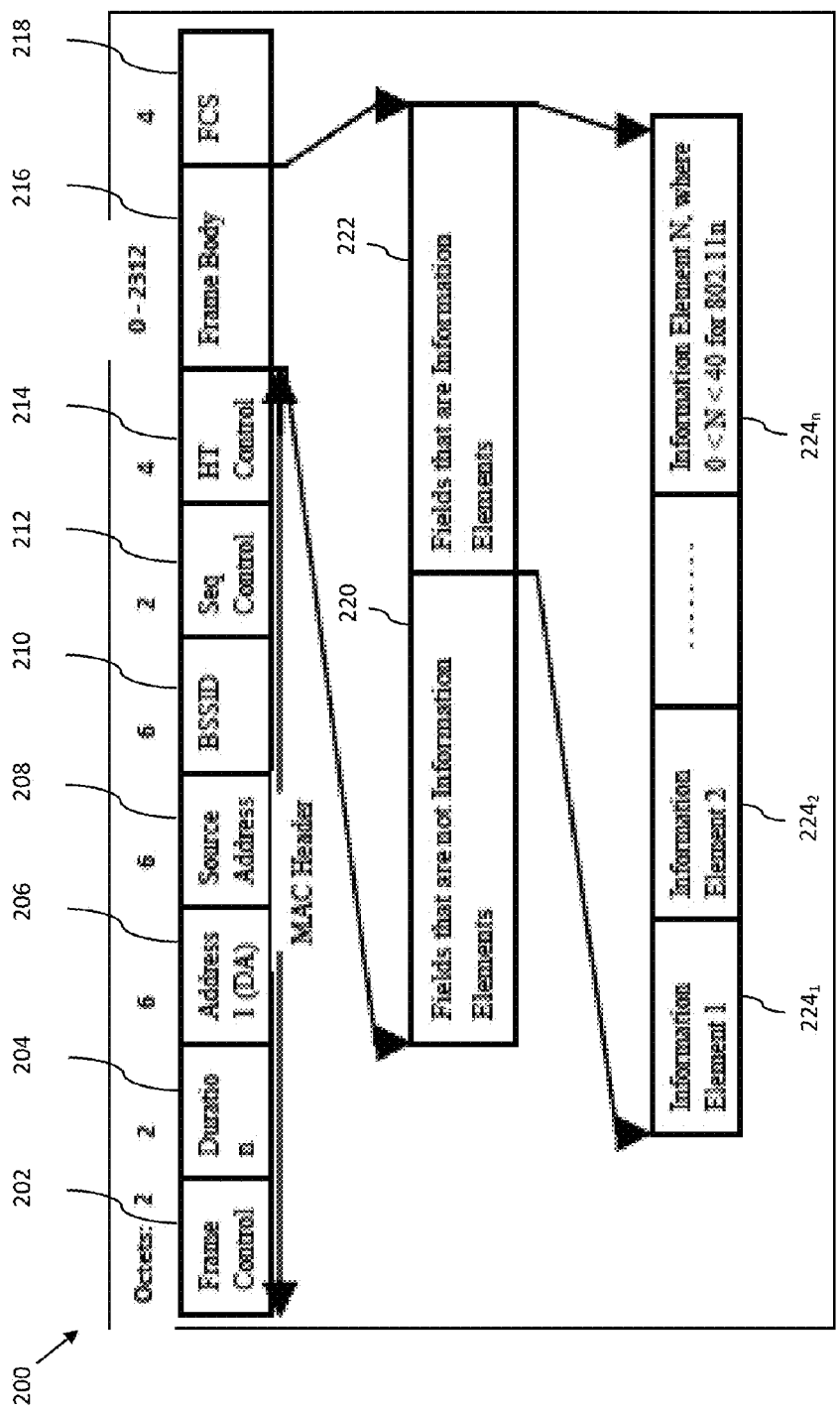
FIG. 2 is a functional block diagram illustrating one standard IEEE Std. 802.11 beacon frame useful with various embodiments of the present disclosure.

FIG. 2 illustrates a diagram of a standard IEEE 802.11 beacon frame 200 as known in the prior art. Typically, a beacon frame originates from a device (e.g., AP, or in the case of certain Wi-Fi Direct implementations, a "Group Owner") and contains information about a network it participates in, e.g., a wireless LAN, and is useful for communicating to nearby devices throughout the serviced area to indicate the characteristics of the connection(s) offered (e.g., capability information, supported data rates, and/or other network parameters) or the presence of one or more devices (e.g., the AP, any other associated APs, and/or any client devices) within the network or infrastructure. Beacons are periodically sent out (i.e., broadcasted) at variable intervals, but typically on the order of every 100 milliseconds.

Various types of information may be included within a beacon frame. A 28-octet MAC header includes a control field 202 (depicting 802.11 protocol version, indicators, etc. to assist in delivery of data), a duration 204, a destination address 206, a source address 208, a sequence control field 212 (containing, e.g., a sequence number useful for assembly of multiple beacons carrying information fragmented in parts), and/or a high throughput control field 214. A frame check sequence (FCS) field 218 checks for cyclic redundancy to validate the received frames.

A notable element within the beacon frame 200 is a service set identifier (SSID, e.g., basic SSID 210). Practically speaking, one or more SSIDs associated with an AP can be used to identify the AP (from a consumer perspective) and/or embed information about the AP (location information, roaming information, etc., at the AP or controller side). SSIDs are particularly effective in delivering information for other devices to "see" because many existing devices are already configured to receive and display SSIDs to users as beacons are broadcast from the AP(s). A variable-length frame body 216 includes fields 220 that are not information elements and fields 222 that are information elements (e.g., $224_1$, $224_2$, $224_n$), which may contain information separate from that contained in SSIDs.

Figure 3:
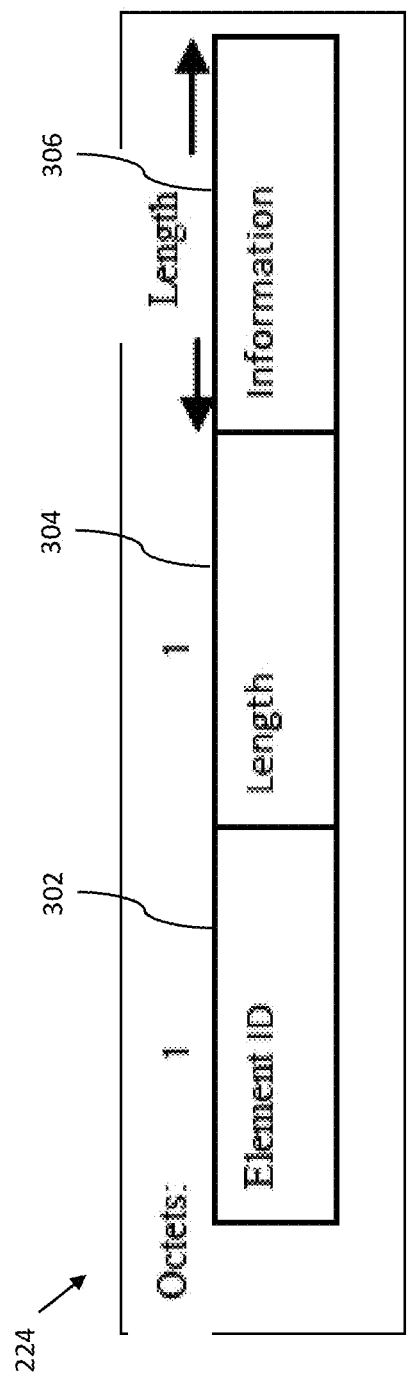
FIG. 3 is a functional block diagram illustrating one exemplary information element from the standard IEEE Std. 802.11 beacon frame.

As shown in the diagram of an exemplary information element 224 of FIG. 3, each information element 224 of a standard beacon frame 200 may include a one-octet element ID (EID) field 302 to identify the information element (allowing 256 unique EIDs 0 through 255 and thus 256 information elements), a one-octet length field 304 (indicating the length of the information field), and a variable length-octet information or data field 306 (whose length can be up to 255 octets).

So-called "bit stuffing" may be used to insert bits comprising data or information into a beacon frame (including SSIDs). Bit-stuffed beacons can be broadcasted to receiving devices, which may then be able to unpack and display the data contained in the beacons. It will be appreciated that the beacons are transmitted directly to a receiver, e.g., from an AP to nearby client devices, which does not require a preexisting connection between the AP and client device (as described elsewhere herein). Even though beacons may reach a client device within range of the AP, the client device may disregard the beacons or otherwise not interact with the data contained therein.

Referring back to the exemplary information element 224 shown in FIGS. 2 and 3, information is embedded in the information field 306, or additionally in length field 304 as described in, inter alia, Gupta et al., "*Bit-Stuffing in 802.11 Beacon Frame: Embedding Non-Standard Custom Information*", International Journal of Computer Applications 63:2 (February 2013), incorporated herein by reference in its entirety. Moreover, large pieces of information may be fragmented over multiple beacons which are later reconstructed, e.g., by using the sequence number field 212 to order the beacons and/or indicating the last fragment in the length field 304.

Figure 4:
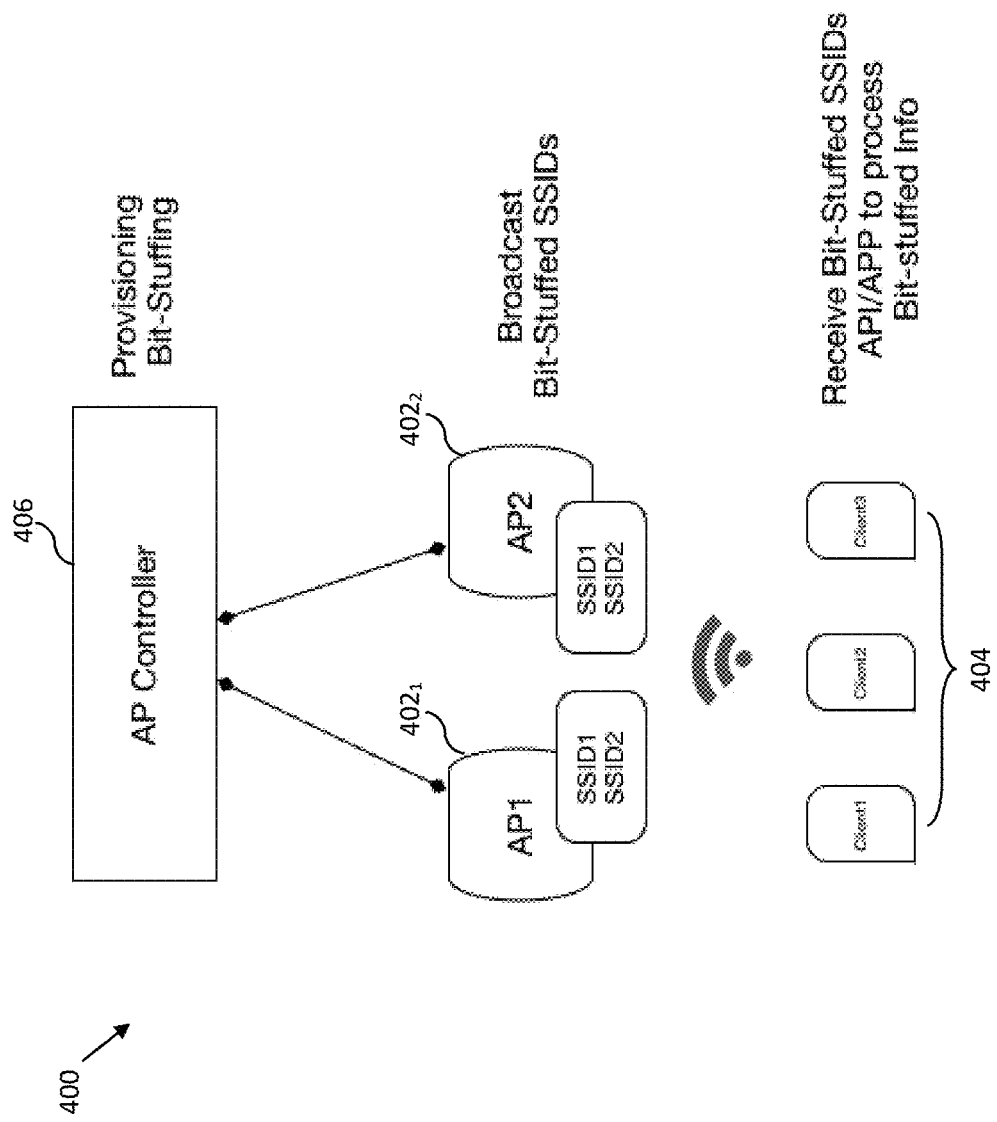
FIG. 4 is a logical block diagram of an exemplary bit stuffing system useful with various embodiments of the present disclosure.

FIG. 4 illustrates an exemplary bit stuffing system 400 useful in practicing the present disclosure. In one exemplary embodiment (i.e., an open-access wireless network employing bit stuffed 802.11 beacons), a local network includes one or more APs $402_1$, $402_2$ serving one or more client devices 404 and users thereof (e.g., customers, passersby, visitors) within the serviced area(s). At least one controller 406 operated by a service provider (which may be located on-site or remotely in the headend or backend of the infrastructure) communicates with the APs to provide information to be distributed to client devices 404. Communications between the AP controller 406 and the AP(s) 402 may be accomplished through a wired network (e.g., LAN, backhaul infrastructure) and/or through a wireless network (e.g., WLAN serviced by Wi-Fi connections). In one or more embodiments of the network, the information provisioned by the AP controller 406 includes a variety of customer data and/or network management data e.g., audio, video, pictures, advertisements, location information, roaming information, network parameters (bandwidth, quality of service, etc.), or services that are available on demand. Depending on the needs and demands of AP(s) and the services employed by the AP(s), myriad types of information, and in fact literally any type of digital data, can be transferred to, and be used by the AP(s), via the exemplary bit stuffing system 400.

The present disclosure contemplates a number of different paradigms for effecting bit-stuffing, including e.g.: (i) "local" bit-stuffing by the AP at its own direction or that of its immediate controller; (ii) local bit-stuffing at the direction of a remote or cloud-based controller with content, metadata to be stuffed cached locally; and (iii) local bit-stuffing based on content, metadata, etc. transmitted from the remote entity or cloud (which may or may not be pre-formatted for stuffing). For example, in one variant, the AP controller 406 may transmit bit-stuff data to the APs 402 ahead of time for local caching (i.e., to pre-position any data necessary to complete the stuffing operation). Doing so can be used to, inter alia, reduce or spread out the transmission load when sent to the APs, particularly if numerous APs that receive the same data exist. As noted, information about a video stream (i.e., metadata such as title, length, genre, etc.) may be transmitted to the APs in a format amenable to being stuffed into the AP beacons (e.g., in appropriately sized packets).

In another variant, downstream devices, such as top-level APs and/or lower-level APs (e.g., children APs as noted supra), may bit-stuff provisioned data in a hierarchical distribution scheme (e.g., the child AP updates its beacons based on how parent AP beacons are configured).

In some embodiments, intelligent APs with robust processing capabilities can be used to shift bit-stuffing away from the backend/headend. For example, information about a video stream may be transmitted to the AP to be bit-stuffed at the AP before being broadcasted to client devices in the vicinity. Such local bit-stuffing allows the AP to locally prioritize, manage, and/or tailor bit stuffed beacons for its service population.

In one or more exemplary embodiments of the system, one or more SSIDs are associated with each AP that services an area, as described supra. Each AP broadcasts a beacon that identifies itself, and a corresponding specific SSID. For example, Table 1 shows APs $402_1$, $402_2$ and their respective SSIDs. Each beacon may contain information about the corresponding AP or the network, including information regarding available services, network capabilities, roaming information, advertisement details, location information, etc. SSIDs broadcasted to compatible client devices (i.e., can interpret the information included in the beacons, e.g., by communicating within a preset protocol used by the AP controller, AP, and client device, as further discussed below) can allow the client device to identify a service or access information of interest. In one variant, this process is automatic; i.e., the AP is capable of pushing the information onto the client device. In another variant, the information may be unique to one or more particular devices (e.g., information about lost and found items or persons may be directed to specific client devices, etc.). In a different embodiment, the beacon may merely trigger a notice that requires a user response to receive further information at the client device.

It will also be appreciated that the system can be configured for "prompt" or broadcast stuffing; e.g., information to be sent (such as an advertisement or coupon for a local business) is sent without any further response, request, or communication with any receiving client, and any device capable of reading the stuffed data (e.g., that has the appropriate API or application software disposed thereon) will receive the "payload" immediately.

TABLE 1

| SSID | AP | Bit Info |
|------|-----|----------|
| SSID1 | AP1 | Location Info, Advertisements |
| SSID2 | AP1 | Bandwidth, QoS Info, Roaming Info |
| SSID1 | AP2 | On-Demand Services |

In another embodiment, each AP separates advertised information into different SSIDs. For example, a first SSID includes one set of information, e.g., location information, advertisements; a second SSID includes another set of information, e.g., on-demand services (such as a list of games, books, song tracks, or movie titles available for streaming with ratings from a service node); a third SSID includes different information, e.g., bandwidth information, quality of service (QoS) information, roaming information, and so on. In the exemplary system of Table 1, AP1 broadcasts SSID1 and SSID2, which consumer devices within range can receive either SSID transmission (and in multi-radio capable clients, potentially both SSIDs). Thus, various end applications can be pushed to end users. The SSIDs are based on virtual LAN configuration (i.e., one virtual LAN per SSID), which involves additional virtual LANs within the AP controller.

Referring again to the exemplary embodiment of the system illustrated in FIG. 4, one or more client device 404 are able to detect and receive beacons containing bit stuffed SSIDs and other information from any number of APs. Mobile devices receive beacons wirelessly via Wi-Fi signals from each AP; thereafter, the client device is able to infer when one or more APs are in service range. Various embodiments of the present disclosure are directed to enabling mobile devices to receive beacons from other SSIDs even while connected to one AP; thereby, allowing continuous discovery of services provided by other APs without disrupting the client device's current services. Specifically, in one embodiment, a given mobile client can simultaneously utilize a first AP within range for e.g., Internet connection, and a second AP for receiving e.g., targeted promotional content such as a coupon, so long as both APs are within wireless range.

In one embodiment, mobile devices (e.g., smartphones, tablets, laptops) may install a downloadable application or "app" (comprising, e.g., an application programming interface (API), as discussed elsewhere herein) that allows the devices to interpret the received beacons by virtue of a beacon-unpacking protocol or language. That is, a common protocol or compatible API (enabled by, e.g., an application available from the service provider operating the AP/controller, the user's "host" service provider (e.g., an MSO) who has access to the AP/controller, etc.) among the client devices, AP(s), and/or controller allows effective transmission of data embedded in beacons and/or unpacking the data from the beacons when received. While the present disclosure envisions a common protocol that is recognized across each of the AP controller, AP, and client device, those of ordinary skill in the related arts will readily appreciate, given the contents of the present disclosure, that recognition of various information embedded in beacons (e.g., those described above such as advertisements, network capabilities, services on demand, etc.) may not require such a shared protocol framework; for example, proprietary or "closed" protocols may be used between a $3^{rd}$ party service and $3^{rd}$ party client-side application. For instance, in one variant, only active subscribers of an MSO can negotiate access to the bit-stuffed beacons by virtue of a protocol, scrambling, an "entitlement"; e.g., by authenticating the user device as a registered MSO-authorized device via MAC address, password, etc.

Wireless Network Architecture and Methods—

Figure 5:
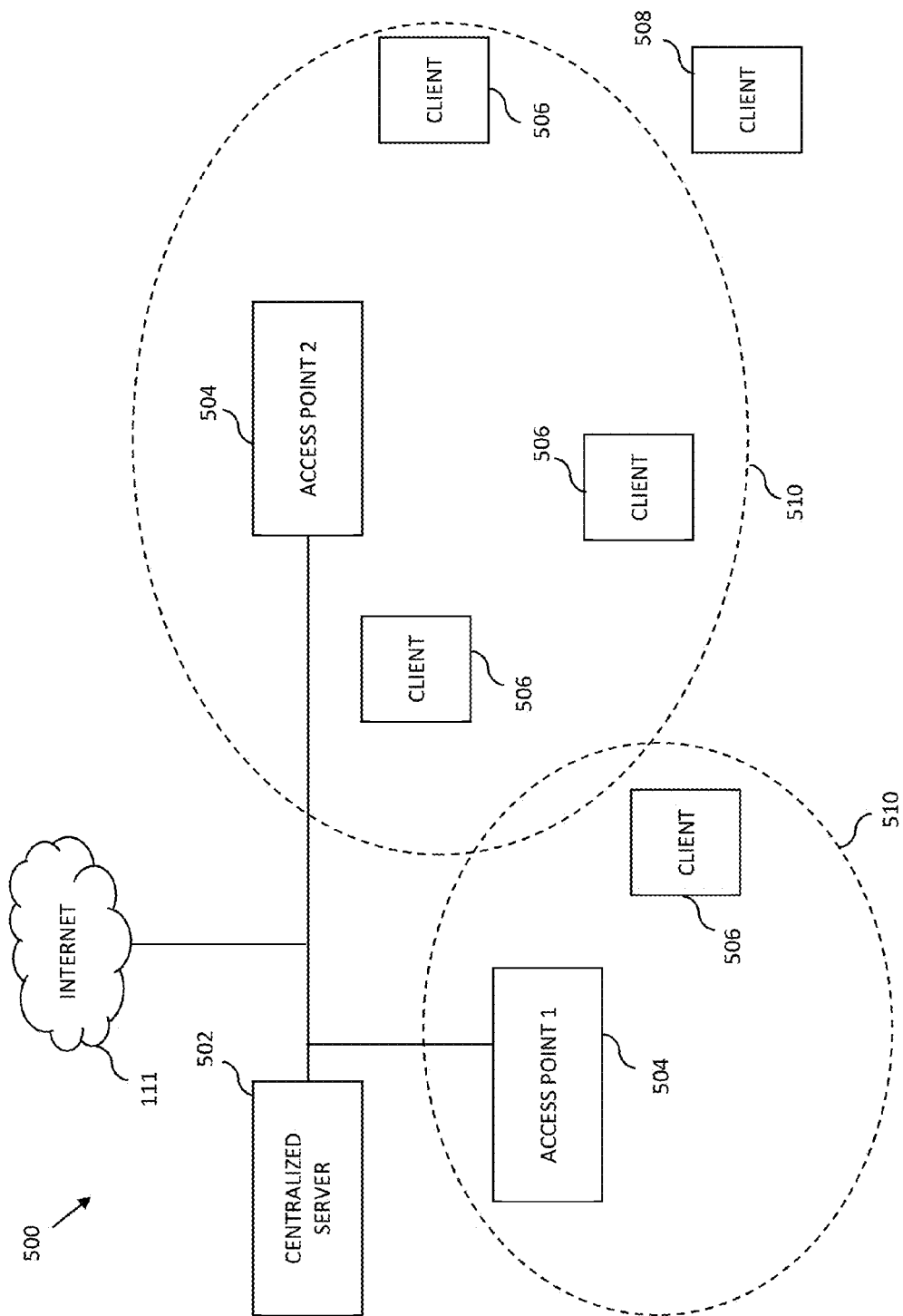
FIG. 5 is a graphical representation of one exemplary embodiment of a wireless open-access network useful with various embodiments of the present disclosure.

FIG. 5 illustrates an exemplary embodiment of a wireless open-access network 500. As shown, the architecture includes a centralized server 502 (locally resident with an AP controller, or remotely at the backend or headend of the system), one or more access points 504 in data communication with the central manager 502 (e.g., via existing network architectures including any wired or wireless Internet connection 111), and a number of client devices 506, 508 (smartphones, laptops, tablets, watches, vehicles, etc.) which may or may not be within range of an AP/AP controller that is served by the centralized server. Client devices may have different capabilities as nodes.

In one or more embodiments, the combined coverage of the wireless connectivity provided by APs is configured to provision network access to a so-called "open" Internet or intranet. More generally, artisans of ordinary skill in the related arts will readily appreciate that the so-called "open" combined coverage of the wireless networks and peer-to-peer sub-networks provides uncontrolled (but limited) network access to any client device. In one embodiment, such open access does not require authorization or authentication for the provision of the limited services. For example, the limited access (if any) can be restricted based on the bit-stuffed beacon information. Such open models advantageously allow mobile device users to opportunistically receive limited amounts/types of information without having to identify themselves, negotiate connections, etc. normally associated with WLAN or similar access protocols.

In one or more embodiments, each AP 504 is located within and/or services a designated area (e.g., a building, room, or plaza for commercial, corporate, academic purposes, and/or any other space suitable for Wi-Fi access). Each AP is configured to provide wireless network coverage 510, and broadcast bit-stuffed beacons within its coverage or connectivity range 510. For example, a coffee shop may have a wireless modem installed within the premises for prospective customers to connect to, including those in the parking lot via inter alia, their Wi-Fi enabled vehicles.

In some embodiments, the bit stuffing of beacons is directly managed by the AP 504 based on indigenous logic that considers various local conditions or considerations (e.g., network management criteria, etc.). In other embodiments, bit stuffed payloads may be provided to the AP, by the AP controller or centralized server 502 based on e.g., broader network wide considerations (e.g., network flow considerations), or particular intelligence present at the controller/server which the APs do not possess. For example, a given local area (e.g., shopping mall) may have a local AP controller and a number of APs at different points throughout the mall; while the local controller is aware of the operation, status, etc. of each AP, and can push locally cached data to each AP for stuffing (such as from a local cache of coupons for stores in the mall), the local controller logic may not be state-aware as to any conditions external to the mall, whether environmental, operational, event-driven, etc. So, a hypothetical tornado or other severe weather event in the general geographic area containing the mall would only be known to a more centralized, situation-aware entity (e.g., the server 502) such as via an EAS (emergency alert) system maintained by the MSO, and EAS alerts for the users of the mall would need to be pushed from the server 502 (or another, such as an EAS server) to the local controller for insertion into beacons broadcast by each AP in the mall.

Moreover, updates to cached content maintained by the AP controller or APs can be pushed from the centralized location. For example, institution or modification of coupons for a given franchise operation (e.g., fast food restaurant) can be coordinated more globally, rather than having each franchise managing such information individually.

Still other preset or dynamic content selection and insertion schemes between the AP, AP controller, and central manager may be implemented with equal success, given the contents of the present disclosure.

As described supra, the broadcast beacons are indiscriminate and contain information which enables a receiving client device 506 to detect and receive the beacon (e.g., beacon 200), unpack and optionally acknowledge its contents, and/or perform an action. In various embodiments, a client device may receive contextually relevant information in its raw format (from, e.g., an AP 504, centralized manager 502, another AP 504, an upstream AP controller, another client device, and/or another $3^{rd}$ party server, etc.), or encapsulated or obfuscated in some manner (e.g., encrypted according to an out-of-band shared secret, etc.). In some embodiments, the context may be related to an event, a business, a general area (business district, academic campus, food court, shopping mall, a building, etc.), etc. and may be of interest to nearby device users (clientele, pedestrians, customers, etc.), as will be described in more detail below.

Once device 506 receives the beacon, the device reads the SSID (e.g., 210). The SSID may contain information that is e.g., relevant to the establishment associated with the AP 504 (e.g., identifying it as a "Joe's Coffee Shop" AP. The beacon may also carry information in its frame body (e.g., 216), which in various embodiments carries information elements (e.g., within information field 306). In other embodiments, information to be unpacked by the receiving device may be embedded in other portions of the beacon as well, as well as successive beacon frames or other data structures.

Information delivered via the beacons may or may not be "contextual" in nature. For instance, non-contextual information can include information which is not selected or provided based on any given context (e.g., without regard to a particular location, user, user device, etc.). An advertisement or coupon for Joe's Coffee Shop might be provided in an indiscriminant manner within e.g., a mall where no such "Does Coffee Shop" is located, to users who may or may not like coffee, etc. Contextually relevant information, on the other hand, may be "passively" contextual (e.g., its context is determined without regard to users who may receive it, such as the foregoing coupon for Joe's Coffee Shop being broadcast via APs in a mall within which the coffee shop is actually located, but without regard to whether any users receiving it like coffee, whether the mall/shop is open or not, etc.), and/or "actively" or dynamically contextual (e.g., the aforementioned coupon being served only during hours when Joe's Coffee Shop is actually open, at greater frequency during cold/rainy weather or certain times of day, etc.).

The information broadcast via bit-stuffed beacons in one embodiment may include advertisement information (e.g., store promotion, coupons), roaming information, available services on-demand (such as videos accessible via the AP, backend, or elsewhere), location information, or network parameters for the AP or other APs connected thereto). In one variant, a store may offer coupons to promote its products or services to prospective customers entering the premises (and therefore definitely within the connectivity range of the AP(s) corresponding to the store). The coupon may include a discount offer (e.g., a percentage or amount off generally or for a particular item), limited quantity, and/or an expiration date (e.g., a set time or relative to the time the beacon was received), which may be dynamically adjusted (e.g., via information contained in subsequent beacons).

In one variant, the advertisement or coupon received by the device is indiscriminately pushed to users; that is, the content of the advertisement is unpacked by the device and shown to the user (e.g., via a display on their mobile device) with no acknowledgement, response or other communication from the user/client.

In another variant, delivery and/or viewing the advertisement or coupon requires a response from the user, e.g., by first accepting the notification and choosing to view the advertisement or coupon. In one particular aspect, the advertisement information may be partially pushed and partially held until approved; for example, general canvassing or alert information may be pushed directly to the user device, while additional details may be viewed when the user indicates interest (e.g., via a UI "click" on the push notification) which then causes delivery of the remaining or more detailed data via subsequent beacons, or establishment of a connection with the AP to receive the content.

In another embodiment, the AP may provide "roaming" information or host-network notification. For example, an airport may be serviced by multiple network service providers (for access to the Internet, cellular connectivity, streaming, etc.); e.g., a cable MSO, cellular service provider, etc. Users of the airport associated with a particular provider (e.g., subscribers) may receive information via the bit-stuffed beacon broadcast at their user devices from an AP associated with the provider; they can then subsequently establish a connection to a given SSID, log into their account, and thereby receive Internet connectivity via their host service provider.

In another embodiment, an AP may also have media on demand (music, text, photos/thumbnails, animations, TV channels, video files, etc. cached on the AP, backend, or another media server or cache with an IP address). Beacons may provide information about available and/or unavailable media (e.g., cache IP address, metadata) without a connection to the AP or elsewhere, such that a user of the device can browse and select on-demand content based on the information or metadata.

In another embodiment, location information provided by the AP via bit-stuffed beacons may also provide useful geographical information (e.g., store name, directions, maps, GPS coordinates, city name, weather, time of day), which may be stored on the AP and/or acquired and maintained from e.g., an AP controller, another AP, a centralized manager, client devices, and/or the Internet. For instance, each AP in a multi-AP installation such as a large mall or airport may cache a map of the facility (including "you are here" type data and directions) such that users with the appropriate app installed on their mobile device can access this information without having to establish a connection to the AP.

In another embodiment, network parameters or capabilities may be included in beacons broadcast by APs. Such parameters may include e.g., maximum and/or average data rates of an AP (e.g., downlink/uplink), number of devices associated/being served, network or IP address thereof, etc. Furthermore, a device may receive parameters via beacons from more than one AP, which allows the device to determine which one to connect to, e.g., during a high-connectivity or peak periods such as in a stadium featuring a sports game, where a device may be serviced by multiple APs. In some embodiments, network parameters may be adjusted (statically or dynamically) to optimize network management. As a result of adjusted network parameters, an AP may advertise greater or lower network capabilities and/or initiate handover to another AP. Techniques for mobility management supporting handovers are described in co-owned and co-pending U.S. patent application Ser. No. 14/959,948 entitled "APPARATUS AND METHOD FOR WIRELESS NETWORK EXTENSIBILITY AND ENHANCEMENT" and filed Dec. 4, 2015, incorporated supra. With respect to the foregoing, various specific measures of link quality may be utilized (including in tandem or in a confirmatory fashion) with equal success. Other examples of link quality include, without limitation: received signal strength (RSS), signal-to-noise ratio (SNR), carrier-to-noise ratio (CNR), signal-to-interference plus noise ratio (SINR), carrier-to-interference plus noise ratio (CINR), bit error rate (BER), block error rate (BLER), packet error rate (PER), etc.

In other embodiments, the beacon may be dynamically configured with literally any type of information. For example, consider a scenario in which a child or a valuable item is lost within a mall. If the mall gains custody of the child or item, the mall operator may configure the AP and/or AP controller to generate beacons that include information about the lost item or child, as well as information about likely owner(s) or guardian(s) (such as likely or known name, gender, location, etc.). So-called "Amber alerts" or other emergency messages may be pushed via the beacons as well.

In other examples, notifications for e.g., a patient waiting for a prescription pickup at a pharmacy, a customer waiting in queue for a table at a restaurant, and other similar approaches may be used. As such, tailored information within the beacon can make the information specific to one or more users who are known or likely to meet certain criteria, and devices associated with some or all of the criteria according to the information can respond to receiving the beacon by notifying the users who are likely or who welcome such information.

In each of the above embodiments and examples, various ways to indicate receipt or desire to receive the information (e.g., pushing or requiring a response) as described supra are equally applicable. Furthermore, in each of the above cases, the AP provisioning the information transmits beacons which contain information generated and/or bit stuffed at the AP 504 or upstream (e.g., at another AP, an AP controller (not shown), the Internet 111, a centralized manager 502, etc.). Any client device capable of Wi-Fi communication may thereafter receive the beacons before establishing any required or optional connection with the AP.

In one exemplary embodiment, the only network connectivity required for reception is the ability to receive an AP beacon. Artisans of ordinary skill in the related arts will readily appreciate that mere reception of a broadcasted beacon can be performed without requiring registration, authentication, authorization, negotiation, etc. between the client and the AP. Thus, an open-access network is formed, which intelligently caters to the context of events, establishments, and/or surrounding areas, as well as devices and users that may be sensitive to the context, as described supra.

In various embodiments, each AP has a virtual limited connectivity range or area (contrast, a physical range or area as determined by e.g., RSSI at the receiver) in which devices 506 may only receive beacons and/or connect to the AP. More directly, the beacon may have limitations in addition to and above the physical limitations of reception (e.g., so-called "geofencing", etc.), such as that established via a GPS receiver on the client, or even physical boundaries of a structure or the like. For example, a device outside a geofence (as determined by their GPS coordinates, or having entered a structure as determined by e.g., scanning of a bar code or other such "check in" which is communicated to the AP/controller) may not act on beacons or connect to an AP 504, even if the AP is known to a user of the device, because APs 504 may only service devices within the geofence. In alternative embodiments, a device 506 may still act on beacons for a geofenced AP, whose service range does not encompass that device (i.e., cannot directly service the device), as described below and elsewhere herein. Such embodiments may be useful to pull potential customers from a broader area, while still limiting network resource utilization to the geofenced area.

Figure 6:
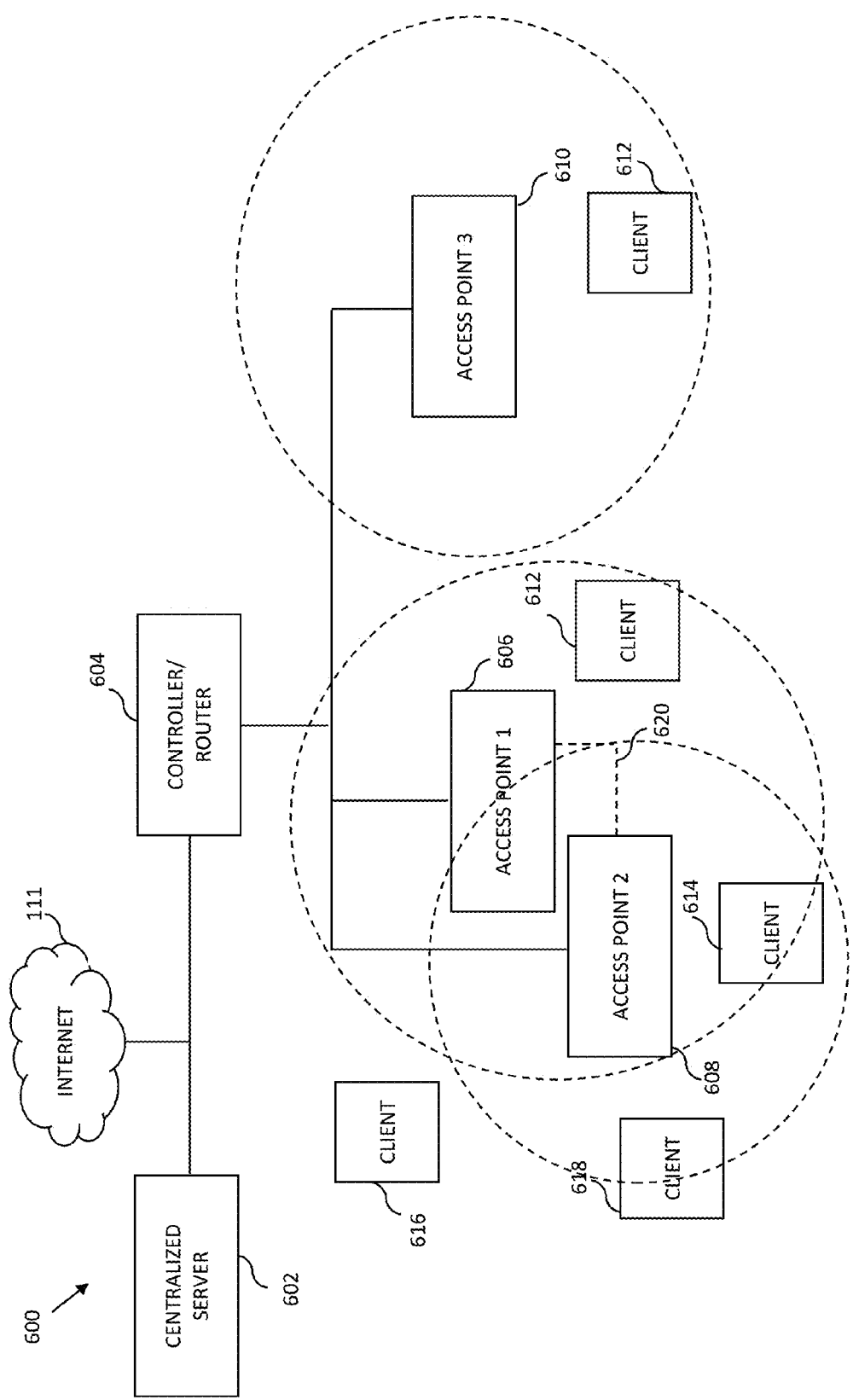
FIG. 6 is a graphical representation of another exemplary embodiment of a wireless open-access network including an access point controller, useful with various embodiments of the present disclosure.

FIG. 6 illustrates another exemplary embodiment of a wireless open-access network 600. The network includes a centralized server 602, one or more routers serving as AP controller(s) 604 in data communication with the server 602, a number of APs 606, 608, 610 in data communication with the controller(s) 604, and a number of client devices 612, 614, 616, 618.

An AP controller assists in managing multiple edge APs (e.g., those considered children APs as described supra) as well as storing information (e.g., caching content that may be inserted via beacon-stuffing), playing a middleman role that shifts processing load away from the backend but not entirely to the edge of the network. The controller 604 may be located within the same premises as the edge APs (e.g., within an intranet, or a network in which the controller and APs are all located within a common area such as a food court of a mall), or away from the premises and disposed elsewhere within a larger infrastructure (e.g., a data center).

In one variant, controller 604 is capable of performing all the tasks of an AP as described with respect to FIG. 5, supra. That is, controller 604 is integrated with an AP and hence has its own connectivity range (not shown) to service client devices directly. In another variant, the controller 604 merely acts as a conduit for data intended to be transmitted to (and optionally from) edge APs. In cases where the edge APs possess high processing power, the AP controller may merely deliver information to be bit stuffed at the APs, or act as a cache or repository for content (e.g., those later requested by the AP and/or a client device in response to initial bit-stuffed "teaser" beacons advertising the availability of the content). Various preset and dynamic allocations of processing or work load are possible depending on needs, as will be appreciated by those of ordinary skill given the present disclosure.

Referring back to FIG. 6, client devices may or may not be within the range serviced by AP(s). As shown, some client devices are within the connectivity range of one or more APs. For example, some client devices 612 are serviced by only one AP (e.g., access points 606, 610); client device 614 is within range of two APs 606, 608 and may be serviced by one or both; client device 616 is outside the range of edge APs 606, 608, 610 and does not receive beacons emitted by the edge APs (but may be serviced by another AP and/or AP controller 604 if within range thereof). Client device 618 is directly serviced by AP 608. In one variant, however, device 618 may be serviced by AP 606 as well, even if the device is not within the range of AP 606. For example, APs 606, 608 may be in communication (e.g., via direct connection via e.g., Gigabit Ethernet or other wired connection, or even over Wi-Fi, as indicated by overlapping connectivity ranges and connection 620) to create a sub-network by utilizing the techniques to extend and enhance existing networks described in co-owned and co-pending U.S. patent application Ser. No. 14/959,948 entitled "APPARATUS AND METHOD FOR WIRELESS NETWORK EXTENSIBILITY AND ENHANCEMENT" and filed Dec. 4, 2015, incorporated supra. Device 618 may be serviced by AP 606, and thereby receive information stored at either or both APs 606, 608 (e.g., in the manner described above with respect to FIG. 5) even though AP 606 is out of range. Device 618 may also be serviced in a peer-to-peer sub-network, such as by receiving beacons and/or connecting (e.g., tethering or acting as a relay) with another client device 614 serviced by AP 606.

Figure 7:
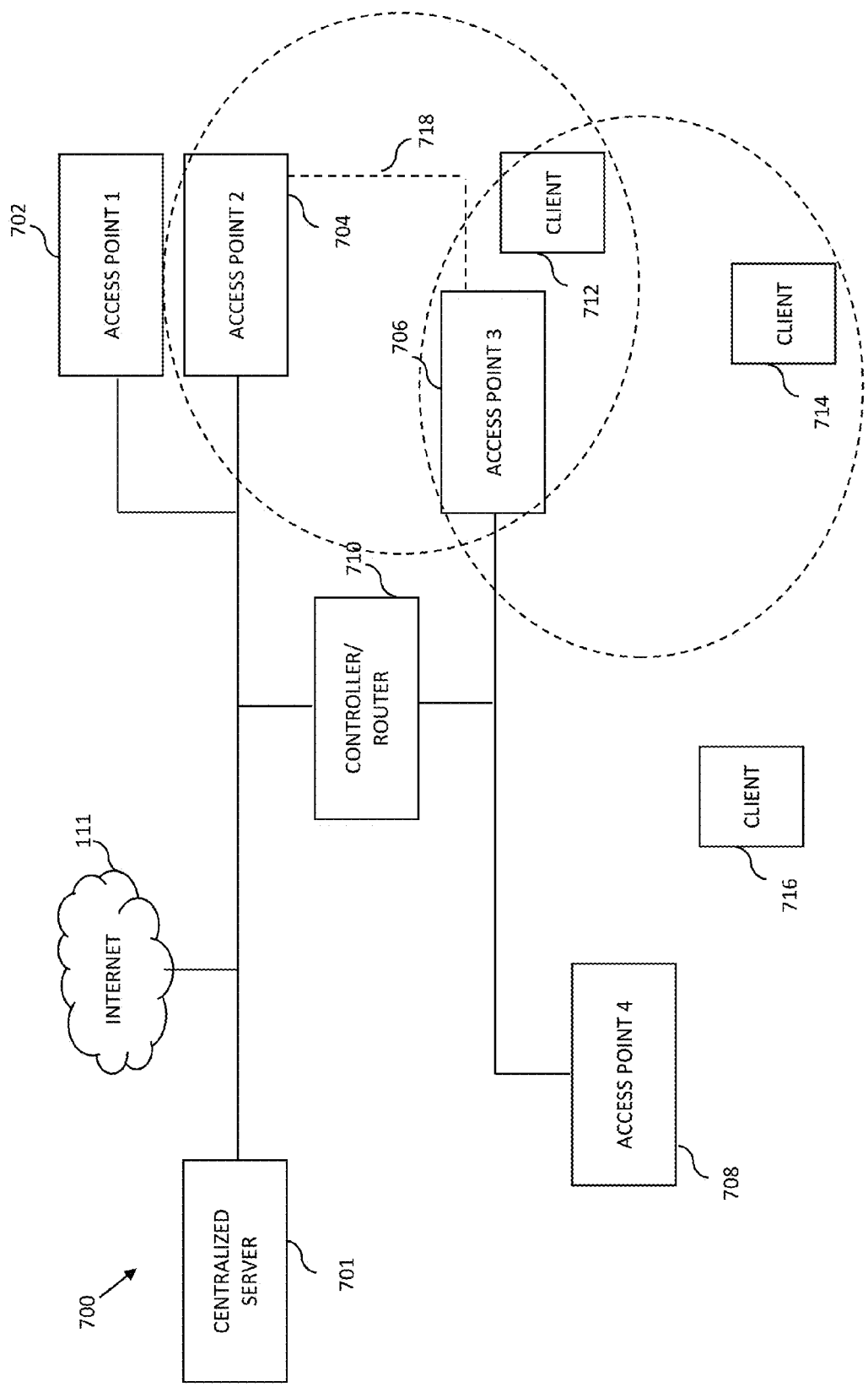
FIG. 7 is a graphical representation of another exemplary embodiment of a wireless open-access network including upstream and downstream access points and an access point controller, useful with various embodiments of the present disclosure.

FIG. 7 illustrates another exemplary embodiment of a wireless open-access network 700. The network includes a centralized server 701, a number of APs 702, 704, 706, 708 in data communication with the centralized server 701 and/or one or more routers serving as AP controller(s) 710 in data communication with central manager 701 and some of the APs as shown (e.g., 704, 706), and a number of client devices 712, 714, 716. Data communication may be achieved via existing network architectures including any wired or wireless Internet connection 111. In the exemplary embodiment, one or more APs 702, 704 are directly connected to the backend (similar to the exemplary embodiment of FIG. 5), and one or more APs 706, 708 are connected to the upstream AP controller 710 (similar to the exemplary embodiment of FIG. 6). In accordance with the discussion supra, APs 702, 704 possessing high processing capabilities may be better suited for direct data communication with the backend (e.g., centralized server 701), while APs 706, 708 without as much processing power may have their load shifted away and toward controller 710 and/or centralized server 701. Various combinations of processing load may be allocated on a preset or dynamic basis.

In one or more embodiments, APs of different types, such as downstream APs 706, 708 (i.e., children APs) and upstream APs 702, 704 may transmit bit stuffed beacons to a client device (e.g., 712) within their connectivity range as is described in, e.g., co-pending and co-owned U.S. patent application Ser. No. 15/002,232 entitled "APPARATUS AND METHOD FOR WIRELESS NETWORK SERVICES IN MOVING VEHICLES" and filed Jan. 20, 2016, and that described in U.S. patent application Ser. No. 14/959,948 entitled "APPARATUS AND METHOD FOR WIRELESS NETWORK EXTENSIBILITY AND ENHANCEMENT" and filed Dec. 4, 2015, each of the foregoing having been incorporated herein by reference supra. As shown, client device 712 is in range of an upstream AP 704 as well as a downstream AP 706. The device 712 may be serviced by and receive information embedded in beacons originating from either AP 704 or 706. The client device 714 is within range of AP 706. In one variant, information intended for device 714 may originate from AP 704 but be broadcast via beacons from AP 706 (i.e., via a daisy-chained delivery). In this case, information is delivered from AP 704 to AP 706 via direct data connection 718 established therebetween (e.g., over Wi-Fi) and/or by sending beacons to AP 706. That is, the data received at AP 706 (from its upstream parent AP 704) may be bit stuffed at AP 706 for broadcast to its devices (e.g., 712, 714).

As shown in FIG. 7, the outside client device 716 is not within range of either AP 704, 706. Thus, device 716 may not be able to receive beacons broadcast by either AP. However, other APs (e.g., 708), controllers, and/or devices (e.g., other client devices) may service device 716 using any of the implementations described elsewhere herein. Moreover, the controller, APs, and client devices of FIG. 7 may implement any task described with respect to FIGS. 5 and 6, supra.

Methods—

Figure 8A:
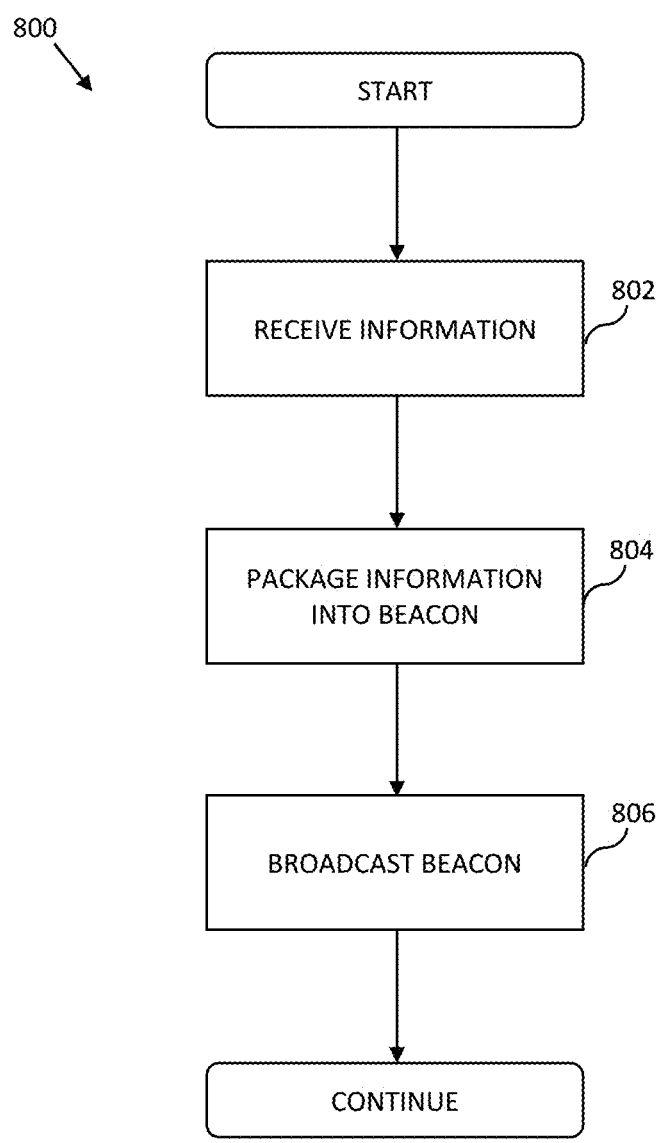
FIGS. 8A and 8B are logical flow diagrams of exemplary embodiments of a generalized method to provide a dynamic open-access network.

FIG. 8A illustrates an exemplary embodiment of a generalized method 800 for an AP to provide a dynamic open-access network 500, 600, 700 to client devices. The open-network useful with method 800 is not limited to those embodied in FIGS. 5-7, and may be used with any architecture utilizing data communication among service nodes capable of wireless communication and dissemination of beacons.

At step 802 of method 800, an AP receives information (e.g., that related to a proximate context) for insertion. In one or more embodiments, the information is received from other network entities or nodes, e.g., (i) a centralized manager or managed operator in the backend or headend of the network, (ii) another AP (e.g., edge AP or AP controller or intermediate router between the AP and the backend), (iii) a client device, and/or (iv) other $3^{rd}$ party servers via e.g., the Internet. The information may be received from more than one node, via one or more connections, and/or simultaneously from multiple nodes. The information may be in raw format (e.g., unencoded video data, unencrypted text), encrypted, or already packaged (e.g., pre-formatted for bit-stuffing). In some embodiments, the information is received in "real time" for immediate delivery or broadcast (i.e., the AP is used as a conduit), including streaming delivery via a plurality of beacons in sequence, or subsequent delivery to another network entity, or for caching for later use.

In various embodiments, the information is associated with a proximate context; e.g., logically proximate or related to certain concepts, products, services, etc., physically proximate to e.g., locations, temporally proximate to past, future, or ongoing events, etc. For example, the event may include promotions, available services on demand, roaming or connection information, network parameters, location information etc. as described supra.

In one variant, the context may relate to products or services bearing a logical relation to a given circumstance (e.g., an advertisement for flight insurance at an airport, or for car insurance at a car dealer).

In another variant, a place of business partnered with or serviced by multiple providers (for access to the Internet, cellular connectivity, streaming, etc.) may provide connection information to devices associated with users/subscribers of the provider. In particular, a client device that recognizes an Internet service provider by receiving SSID information from a beacon broadcasted by an AP serviced by that provider, may then opt to connect to the service.

In another variant, a type of context may be informational or entertainment content (audio, video, images, text, books, games, etc.) available for streaming or distribution. A user interface or display associated with one or more AP(s) (or other entities in communication therewith, such as an AP controller, central server, the Internet, etc.) may show available titles or preview of various content that is accessible near the AP.

In yet another variant, a context may be network parameters for managing device connections to multiple APs. For example, one AP may be overloaded with multiple devices attempting to connect at once; the AP may broadcast network conditions of other APs with better data rate, fewer current connections, better range, etc. within the network in order to offload connections to alleviate the congestion.

In still other variants, the context may be location, time, date, weather, and/or other geographic attributes useful for nearby users.

In yet further variants, the context may be one or more individual users (or classes or types of users) themselves, whether determined "passively" or "actively" as discussed supra. For instance, a class comprising only MSO subscribers may be "passively" accessed by virtue of the subscribers having the MSO-supplied application program on their portable device; any time any one of them is within range of an AP broadcasting MSO-pushed data or information (e.g., a promotion for a first-run movie now available to subscribers of the MSO), their client "app" will unpack any stuffed data from the received beacons, and alert the user in any number of ways (e.g., immediately, via a screen display, later when the user scrolls through their received texts/notifications, etc.).

In another embodiment, the user may be notified via an email to the user's MSO email account issued by a central message server in response to an acknowledgment by the user or other response from the client device indicating that the particular subscriber or device was in fact proximate to a given AP (and hence by inference, a given location, event, etc.). As one example, an MSO subscriber that has the MSO app loaded onto their smartphone, after attending a concert sponsored by the MSO, might receive coupons or advertisements for other concerts via their MSO email account based on their incidental contact (which may be totally passive or blind) with an AP broadcasting an MSO-sponsored beacon, to which the user's smartphone app responds indicating that the user is an MSO subscriber and their identity (or e.g., device identity such as MAC address, to which the MSO can correlate the user from e.g., backend subscriber account databases).

In yet another embodiment, other apps operative to run on the client device are used to determine context, whether remotely or on the client itself. For instance, one variant uses search terms gleaned from e.g., an Internet browser application (e.g., Google Chrome® or the like) running on the client to determine one or more relevant device or user contexts. In one implementation, a routine in effect similar to a "key logger" running within the MSO app accesses UI input data (e.g., capacitive touch screen) or an API on the client device operating system (OS) to compile search terms of the user, and either use them locally, or send them to another entity (which may be the AP, or other entities further upstream) as indicators of context. For example, a user who types in or verbally enters the query "Nearest Coffee Shop" on their browser UI would be used by the local or remote process to indicate e.g., a high probability that the user likes or routinely consumes coffee, and hence Joe's Coffee Shop advertisements or coupons might be particularly applicable. In one variant, these gleaned search terms are maintained within a database of the MSO app on the user's mobile device, and used in effect to prioritize broadcast beacon content received by the device, such as by filtering or lowering the priority of non-associated content, or even calculating a logical proximity (e.g., since the user ostensibly likes coffee, other logically proximate beverages or substances such as tea, energy drinks, coffee flavored ice cream, etc. might also be of interest to the user, and hence ads or promotions for such "correlated" products or services would remain unfiltered or elevated in order of priority of display).

In another variant, the gleaned terms are communicated to the AP logic via e.g., a response to the beacon, message after connection has been established, or other communication) for either use thereby in selecting/filtering subsequent beacon-stuffed content, or for passing upstream to an associated controller, content server process, etc.

In these and other variants, any type of information that is relevant to surrounding events or characteristics of an establishment, area, location, product, service, user, etc. (i.e., the context) may be determined by the AP, the centralized manager, other APs in the network (e.g., upstream APs, children APs, AP controllers), and/or client devices within range. In other variants, such proximate context may be determined dynamically, depending on needs that arise during operation of the AP.

At step 804, the received information is packaged into one or more beacons. In various embodiments, the beacons are bit stuffed according to the discussion supra with respect to FIGS. 2-4. In one or more embodiments, the contextually relevant information is embedded into the various fields, e.g., the SSID (e.g., 210), information field (e.g., 306) within one or more information elements of the frame body of the beacon. Both or either non-contextually relevant information and/or contextually relevant information may be bit-stuffed into a beacon. In some variants, the target information to be read by a receiving device will be marked for interpretation upon receipt. For example, a field within the beacon may include a table that lists which element IDs correspond to information elements with contextually relevant information.

In other embodiments, other portions of a beacon frame may be utilized to transmit information. For instance, information intended for a particular field, e.g., a source address, may be included in other fields, e.g., information field 306. Numerous beacons containing the same information may be created, as beacons are broadcast at regular intervals.

In some embodiments, the contextually relevant information is fragmented into multiple beacon frames to be assembled after receipt. In this case, a sequence number can be embedded in each beacon frame to allow a receiving device to arrange in the correct sequence. Sequence control field 212 may be useful for assembling multiple fragmented beacons, as previously referenced supra.

In some embodiments, the information may have already been embedded into one or more beacons received. In one variant, the received information may be changed upon receipt, depending on changed environments, needs, etc. For example, a change in destination address (e.g., 206) or source address (e.g., 208) of, e.g., content on other nodes, may occur at the receiving AP after a beacon containing the outdated address is received. Any other type of information is mutable once the beacon is received. In one or more embodiments, the received beacons may also be encrypted and/or verified for integrity (e.g., hash check, verify checksum with FCS field 218) and/or accuracy of the information (e.g., customer name, coupon discount percentage).

At step 806, the AP broadcasts the beacon(s). In various embodiments, beacons are announced via wireless means, e.g., over Wi-Fi. Beacons may have range or other limitations other than physical limitations (e.g., virtual geofences, etc.). Client devices within range which are capable of receiving beacons and recognizing them by virtue of a common protocol enabled by, e.g., a mobile application, a program, native capability, may read the information embedded in the broadcast beacons. While in some embodiments the beacons may be broadcasted in any order without regard to fragmentation, size of beacons, order, etc., the AP may queue beacons in a particular order in other embodiments. For example, the beacons may be queued to be broadcast in order of size (e.g., smallest beacons first) or in sequence or so as to minimize any fragmentation issues upon receipt, or according to any other prioritization scheme, such as contextual relevance. Queuing of beacons may also be used to minimize the burden on the network, optimize the transmission rate, and/or optimize the later receipt of beacons.

Figure 8B:
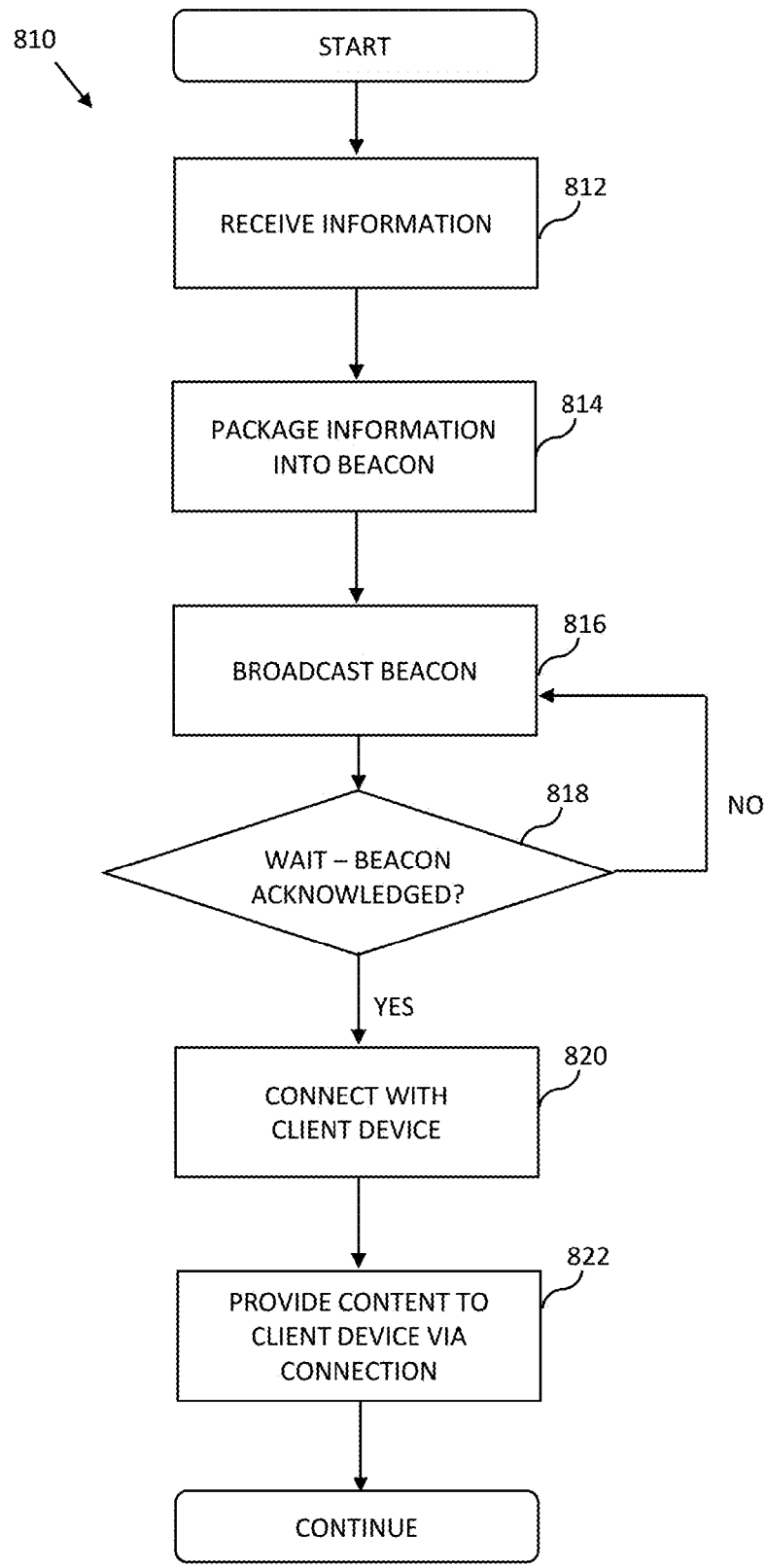

FIG. 8B illustrates another exemplary embodiment of a generalized method 810 for an AP to provide a dynamic open-access network 500, 600, 700 to client devices.

At step 812, the AP receives information to be inserted into the beacons. In some embodiments, the information is received for immediate, or alternatively subsequent delivery to another network entity or caching.

At step 814, the received information is packaged into one or more beacons at the AP. In some embodiments, some or all of the received information is already packaged into beacon-friendly formats or data structures (e.g., packets or bit streams of prescribed length or format).

At step 816, beacons with portions or all of the received information are broadcast from the AP. Client devices within range of the AP may receive and recognize the beacons that are broadcast.

At step 818, the AP waits to determine whether the beacon that is broadcast is recognized by a client device. In one embodiment, the beacon may contain information which a user of the client device may respond to. In another embodiment, the beacon may contain information which the device may automatically act upon (e.g., network statistics used to decide on which AP to connect to). In one or more embodiments, the client device initiates a connection with an AP based on a received beacon. In another embodiment, if the client device or a user thereof is specifically known and targeted (i.e., beacons were tailored for one or more pre-identified client devices or users), the AP may anticipate a connection request from that client device. In other variants, the AP may attempt to establish a connection with the client device.

At step 820, the AP establishes a dedicated connection with the client device. In various embodiments, the connection is made over Wi-Fi, although any other means of wireless connectivity may be used to implement the present disclosure. The SSID embedded within the broadcast beacon (in the SSID field or other fields that may contain data) may allow the receiving client device to recognize and connect to the AP where the beacon originated from. Associating a connection with one or more client devices within range may allow e.g., the AP to render the available services (e.g., provide additional data or content via the established connection, e.g., video or audio streaming, updating map information at intervals, additional graphics).

In one or more embodiments, authentication is required before connecting. Credentials may be known by the device or a user thereof (e.g., authentication, authorization, accounting, etc.) or they may be included in the beacon itself, allowing an automatic connection upon user approval (e.g., click on a notification, accept the terms of connection, acknowledge and approve the pending connection, etc.)

At step 822, such content is then provided to the client device using the established connection. In one embodiment, the connection persists until the AP or the client device disconnects manually or moves out of range. If the AP or client device moves into range, the connection may be automatically reestablished or require a reconnection using the steps above. In another embodiment, the connection may be temporary and end even if the client device remains within range, e.g., by timing out. In some variants, the connection may be conditional, e.g., by meeting one or more predetermined criteria (e.g., coupon is used, video has ended). In some embodiments, the content is encrypted at the AP and/or an upstream entity before being delivered to the client device. The content may also be checked for integrity (e.g., verify checksum with FCS field 218, hash check) and/or accuracy of the information to be provided (e.g., customer name, coupon discount percentage).

In some embodiments, at least part of the content or contextual information is displayed on the client device or a display screen associated with the device (including, e.g., a user interface (UI) or a graphical user interface (GUI)). In some variants, a response from the client device is required before displaying the information. In another embodiment, the connection established between an AP and the client device may establish the AP as a conduit, where content is sourced upstream (e.g., another AP, an AP controller, a centralized manager) or from another client device within range of the AP. In some variants, the connection between client devices may be transitioned to a peer to peer connection via e.g., handover. For example, the AP may allow exchange of IP addresses or client identification (e.g., MAC address) between two or more client devices, which may reduce latency and improve connectivity. In peer-to-peer implementations, the client devices may directly exchange information such as location or data. Various other uses and modifications of the aforementioned schema and combinations thereof are possible.

Figure 9A:
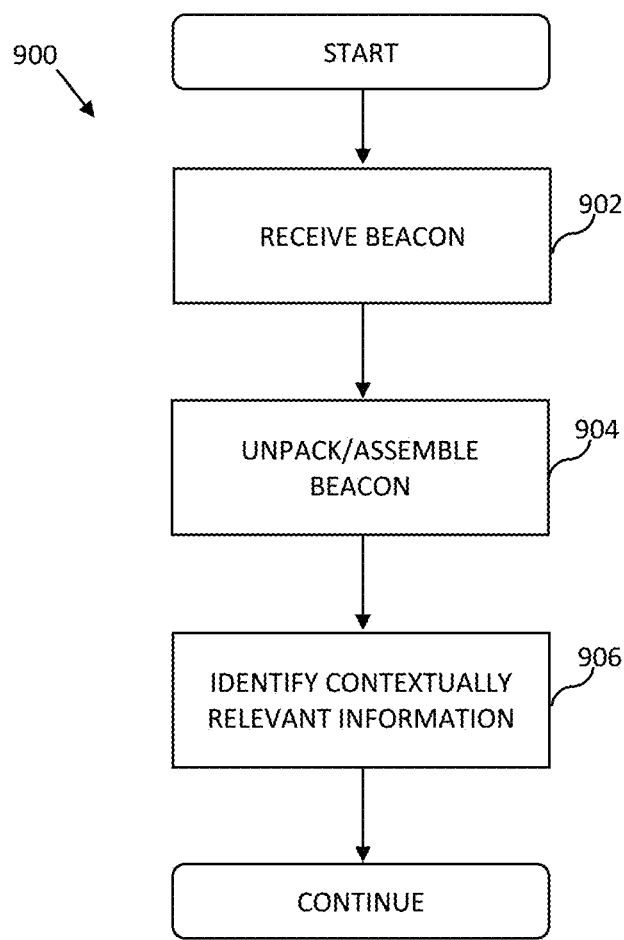
FIGS. 9A and 9B are logical flow diagrams of exemplary embodiments of a generalized method to participate in a dynamic open-access network.

FIG. 9A illustrates an exemplary embodiment of a generalized method 900 for a client device to participate in a dynamic open-access network. The open-network useful with method 900 is not limited to those embodied in FIGS. 5-8, and may be used with any architecture utilizing data communication among service nodes capable of wireless communication and dissemination of beacons in accordance with the principles described herein.

At step 902 of method 900, a client device receives one or more beacons from an entity within the network, such as an AP providing wireless network coverage that overlaps with the location of the client device. In various embodiments, the client device receives and detects beacons via a Wi-Fi protocol. Moreover, the device is able to read the contents of the beacons, including the frame body and its components as previously described with reference to FIGS. 2 and 3.

At step 904, the client device interprets each received beacon, in context with other received beacons or on an individual basis. In one embodiment, the client device assembles each received beacon according to known protocol (such as those established by an API, application, or native function within the device, as described elsewhere herein). The received beacon may be encrypted, fragmented, out of order, etc. Thus, the client device may assemble beacons at predetermined intervals (i.e., wait until an appreciable quantity of beacons registers at the device) or attempt to reconstruct them as they arrive. Certain fields within the beacon frame (e.g., sequence control field 212) may be useful in reassembling beacons that have partial information embedded therein, e.g., data exceeding the 255-octet capacity of a beacon frame. In essence, the client device attempts to "read" the beacons that it receives from APs within range. Nonetheless, in some embodiments, a client device may be limited to its capabilities, e.g., to decrypt, reassemble and/or rearrange beacons. That is, a device that is unable to decrypt an encrypted beacon may not be able to interpret the information.

In some embodiments, an MSO-provided API (such as that enabled by a downloadable application and/or native functionality within device, etc.) may define the necessary bit fields and/or field codes that are necessary to unpack and/or assemble the received beacons and information contained therein. The central manager may provide updated definitions, legends, tables, protocol information, etc. to allow the device to communicate and coordinate with the central manager, other client device(s), and/or AP(s), and reconstruct the beacons.

At step 906, the client device identifies and interprets the desired information (e.g., the contextually relevant information) embedded in the received beacon(s). In various embodiments, the relevant information is pulled out of information field 306, although the information may also have been bit stuffed in other fields within the beacon, as discussed in connection with FIGS. 2 and 3, supra. In some embodiments, to assist in identification of contextual information among non-relevant information (e.g., in fields that are not information elements (e.g., 220)), the information to be read by the client device will have been marked for interpretation upon receipt. In these and other embodiments, a client-side API or client-side application residing on the client device can process the received beacon via a protocol that can identify the relevant information.

In one variant, such identification may be predetermined by the centralized manager according to a pre-defined common protocol that is disseminated to client devices. In some variants, the common protocol is interpreted by a client-side API or client-side application. In other embodiments, the common protocol may be fixed as a native capability of the modem itself (e.g., via compliance with a standard, or other compliance body). In some variants, the identification of relevant information may be dynamic and/or based on rules, e.g., the centralized manager may provide criteria or rules as discrete updates (e.g., application packages, downloadable applications) or via an established connection per, e.g., step 820 or step 918 (discussed below). As a result, the client device receives and interprets information that is associated with the proximate context, which may be used for quick and open access to nearby networks to e.g., enable engagement with events, offers and services that may be relevant to a user of the device. The contextually relevant information may require further action from the device or its user (e.g., it may request acceptance of one or more choices such as an AP to connect to based on disparate network parameters, choose content to be delivered on demand). Alternatively, the contextually relevant information may be a notification which requires no action (e.g., indicate a location of nearby store, scroll advertisement content, display a discount amount). Still other variations thereof may be appreciated by those of ordinary skill in the related arts, given the contents of the present disclosure.

Figure 9B:
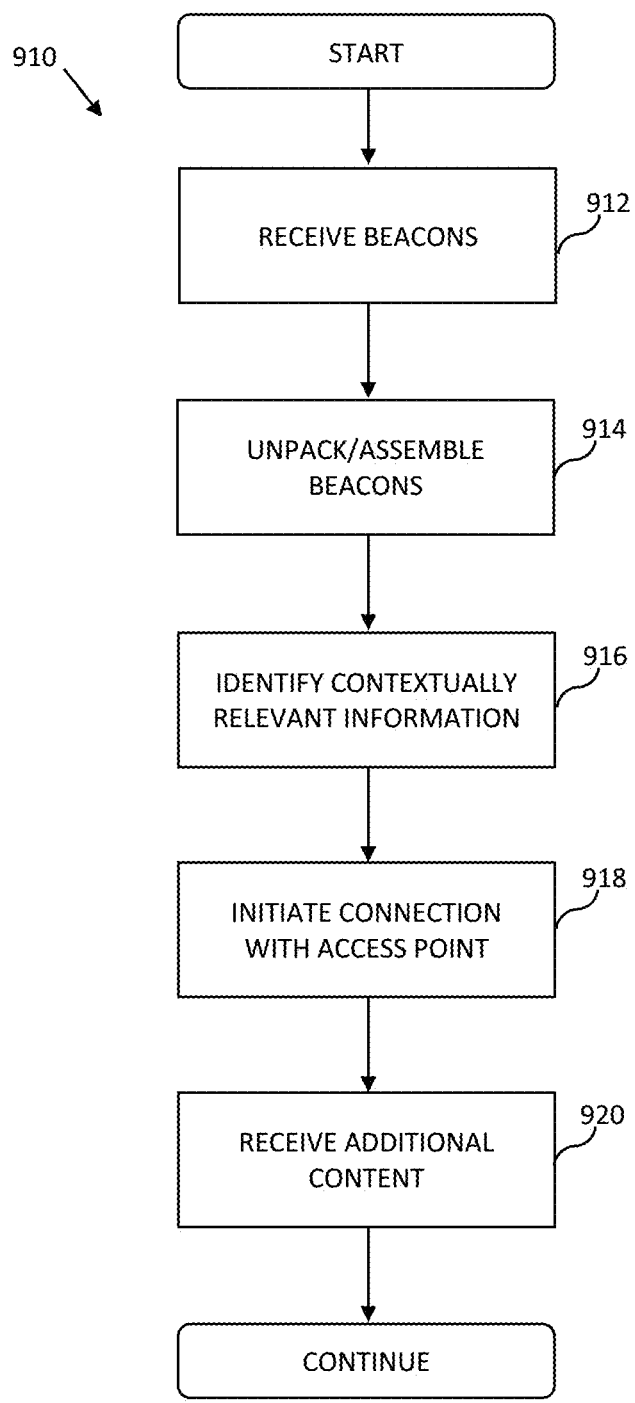

FIG. 9B illustrates another exemplary embodiment of a generalized method 910 for a client device to participate in a dynamic open-access network.

At step 912, the client device enters the coverage region of one or more APs, and receives and detects beacons broadcast from the AP(s).

At step 914, the client device interprets each received beacon, including assembling any fragmented, out-of-order, encrypted, etc. beacons. The client device may assemble the received beacons at predetermined intervals or as they are received. In essence, the client device attempts to "read" the beacons that it receives from APs within range. In various embodiments, the client device is able to unpack and understand the embedded information in the beacons via a common protocol provided by, e.g., an MSO-distributed application or API, or a native functionality within the device.

At step 916, the client device identifies relevant information from the beacons, including but not limited to information related to proximate context. The contextually relevant information may require no further action. For example, it may simply require information to be read by a user of the device (e.g., indicate a location of nearby store, scroll advertisement content, display a discount amount). Alternatively, the identified information may require a further action from or interaction with the device or the user (e.g., it may request acceptance of one or more choices such as an AP to connect to based on disparate network parameters, choose content to be delivered on demand, deliver content or further information). In the case where further interaction is needed between the AP and the client device, a dedicated connection is required.

Optionally, at step 918, the client device initiates a connection with the AP which served the beacons. In various embodiments, the connection comprises a dedicated Wi-Fi connection; however, other types of appropriate wireless signal, communication or interface may be used to establish a connection between the AP and client device. In one embodiment, a connection between the AP and client device allows the client device to connect to other client devices within range of the AP or the network, thereby enabling peer-to-peer connection as further discussed elsewhere herein.

In another embodiment, once the client device initiates a connection, the AP acknowledges the request for connection and establishes the connection. Such "public" connections are advantageous for allowing a quick, instantaneous mechanism for content delivery. In another embodiment, the AP requires credentials or conditional rules to be met before establishing the connection. In one variant, the credentials include user-inputted information, such as a password. In some variants, the credentials include a certificate residing on the client device, a unique identifier (e.g., MAC address, serial ID), or a type of device (e.g., only either one of phones or laptops may connect to the AP, or only devices running iOS® or Android™ may connect to the AP). In other variants, compatibility (by virtue of, e.g., software versions or common protocol among client device, AP(s), centralized manager, and/or other network entities) is assessed by the client device or the AP before establishing the connection.

At step 920, the client device receives additional content via the established connection. In one embodiment, the content may be related to the proximate context (related to information previously embedded in beacons). Typically, this type of content is too large to carry over beacons. For example, the user of the device may choose to further receive the full advertisement including any discount offers and participating locations. The AP may then deliver the content, including any images, animations, videos, text, and any other type of promotional content of interest to the user. In another embodiment, the content is unrelated to the proximate context although the connection may be established for contextual reasons. For example, a user may approach a nearby AP (e.g., a service node) and receive metadata related to services on demand, such as video streaming. The fact that the user is aware of the node is relevant to the context that the receiving device is near the node; however, the actual content (e.g., a movie) is unrelated to the context. In another embodiment, handing over of the connection may be done by multiple APs. Once the client device connects with an AP and moves out of range or detects another AP offering a higher-quality connection (with fewer connected devices, higher data rate, etc.), the AP may initiate a handover to another AP. Various mobility management techniques supporting handovers are described in co-owned and co-pending U.S. patent application Ser. No. 14/959,948 entitled "APPARATUS AND METHOD FOR WIRELESS NETWORK EXTENSIBILITY AND ENHANCEMENT" and filed Dec. 4, 2015, incorporated herein by reference supra.

It can be appreciated that any type of data, information or content, including additional beacons, may be received by the client device after a connection is established with the AP. Moreover, the client device may communicate back to the AP (or other APs and/or other client devices present in the network, the mechanism for which is described supra as well as in co-owned and co-pending U.S. patent application Ser. No. 14/959,948, and send data as allowed by the AP. Various other uses and modifications of the aforementioned schema and combinations thereof are possible.

While the aforementioned methods have been discussed within the context of beacon-based discovery and initiation of wireless connections and/or delivery of content, artisans given the present disclosure will readily appreciate that a variety of other techniques may be used with equal success, without departing from the principles described herein. Other discovery techniques include, without limitation: pilot signal search, assisted discovery (e.g., via other AP(s), AP controller, other client devices, and/or other network entities), out-of-band discovery services, use of alternate interfaces (e.g., Bluetooth) to initiate handshake or service connection, network registration services, etc.

Apparatus—

Figure 10:
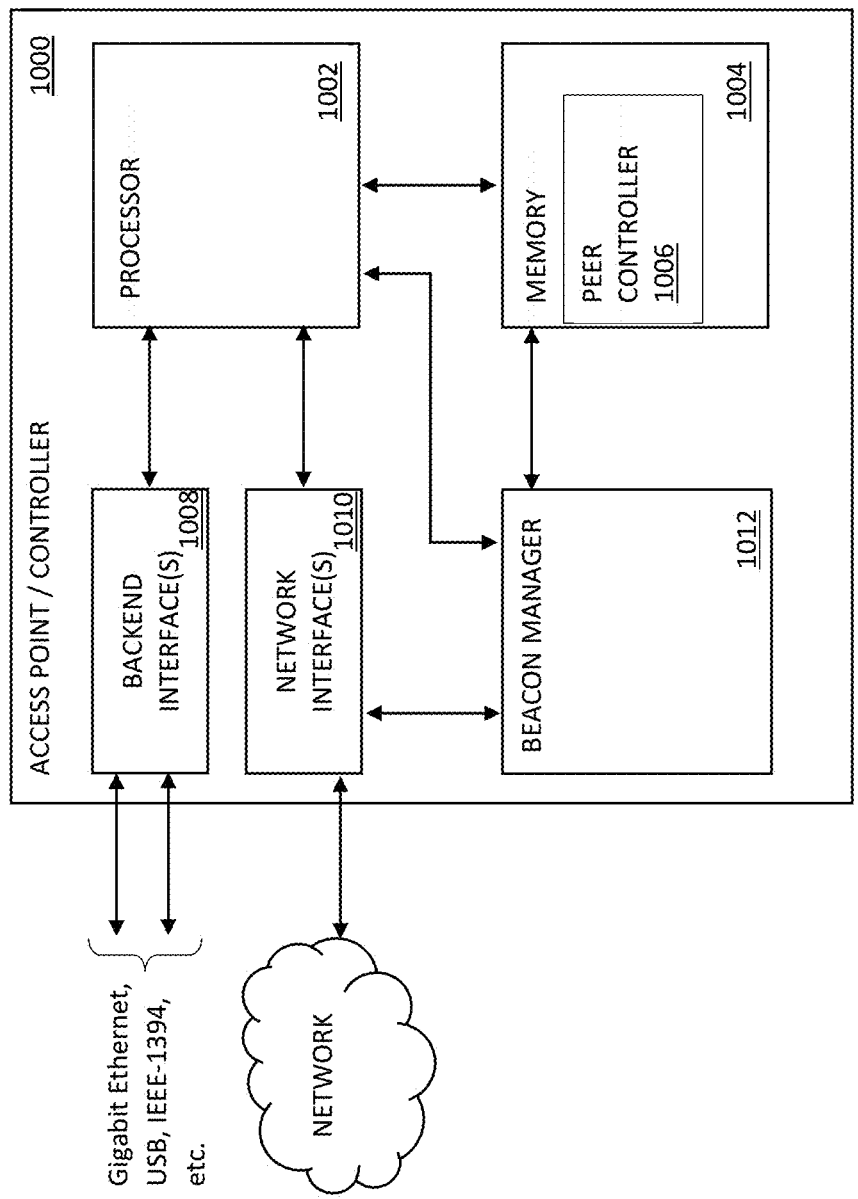
FIG. 10 is a functional block diagram of an exemplary embodiment of an access point apparatus configured according to the present disclosure.

FIG. 10 illustrates an exemplary access point (AP) 1000 according to the present disclosure. As shown, the AP includes, inter alia, a processor 1002, a memory module 1004, a peer controller (PC) 1006, a backend (e.g., headend, backhaul) network interface 1008, and a network (e.g., LAN, WLAN) interface 1010. Although the exemplary AP 1000 may be used as described within the present disclosure, artisans of ordinary skill in the related arts will readily appreciate, given the present disclosure, that the AP may be virtualized and/or distributed within other core network entities (thus having ready access to power for continued operation), the foregoing apparatus being purely illustrative. More particularly, the AP may be located within the backend, e.g., near or at the centralized manager, e.g., MSO; an intermediate entity, e.g., data center, AP controller; and/or within the "cloud" entities or other portions of the infrastructure the AP is a part of. In some embodiments, AP 1000 may also function as an upstream AP (e.g., parent AP), a downstream or edge AP (e.g., children AP), or an AP controller, as described supra, with equivalent effectiveness.

In one exemplary embodiment, the processor 1002 may include one or more of a digital signal processor, microprocessor, field-programmable gate array, or plurality of processing components mounted on one or more substrates. The processor 1002 may also comprise an internal cache memory. The processing subsystem is in communication with a memory subsystem 1004, the latter including memory which may for example comprise SRAM, flash, and/or SDRAM components. The memory subsystem may implement one or more of DMA type hardware, so as to facilitate data accesses as is well known in the art. The memory subsystem of the exemplary embodiment contains computer-executable instructions which are executable by the processor subsystem.

The processing apparatus 1002 is configured to execute at least one computer program stored in memory 1004 (e.g., a non-transitory computer readable storage medium). The computer program may include a plurality of computer readable instructions configured to perform the complementary logical functions of a peer controller (PC) 1006. Other embodiments may implement such functionality within dedicated hardware, logic, and/or specialized co-processors (not shown). For instance, the peer controller (or portions of the functionality thereof) can be located in one or more MSO data centers, and/or in other "cloud" entities (whether within our outside of the MSO network).

In one embodiment, as shown, the AP includes a discrete beacon manager module 1012. The beacon manager 1012 is a hardware or software module that is in data communication with the processor 1002, memory 1004 and/or one or more interfaces 1008, 1010 to the external network. In some embodiments, the beacon manager 1012 is internal to the processor, memory, or other components of the AP 1000. The beacon manager is configured to pack information that resides on the AP or received from another network entity (such as another AP, an AP controller, centralized manager, and/or one or more client devices). At the beacon manager (and/or other components of the AP, e.g., processor 1002), information is embedded in beacons by way of bit stuffing, as discussed supra. In some variants, the beacon manager accesses the memory module 1004 to retrieve stored data. The data or information relates to open-access features such as available services, promotions offered by an establishment associated with the AP, network conditions, quality of service, location information, etc. Such features are accessible by nearby client devices that are within the connectivity range of the AP. In one variant, the beacon manager adds a layer of protection to beacons by encrypting them In some embodiments, the beacon manager 1012 includes an internal cache or memory configured to temporarily hold a number of beacons before transmission via the network interfaces, rather than accessing an external memory module (e.g., 1004). In other embodiments, application program interfaces (APIs) such as those included in an MSO-provided application or those natively available on the AP (e.g., as part of the computer program noted supra or exclusively internal to the beacon manager module 1012) may also reside in the internal cache or other memory 1004. Such APIs may include common network protocols or programming languages configured to enable communication with other network entities as well as use of bit stuffing procedures that a receiving device may interpret for extracting information from the beacons.

In one embodiment, the complementary PC 1006 is configured to register wireless client devices and centrally control the broader wireless network (and constituent peer-to-peer sub-networks). Such configuration include, e.g., providing network identification (e.g., to APs and client devices within range), managing network congestion, and managing capabilities supported by the wireless network. In some variants, the PC 1006 may be configured to push (or respond to pull requests) for other APs or client devices so as to augment and/or enhance the coverage area.

In one embodiment, the complementary PC 1006 is further configured to communicate with one or more authentication, authorization, and accounting (AAA) servers of the network. The AAA servers are configured to provide services for, e.g., authorization and/or control of network subscribers for intelligently controlling access to computer resources, enforcing policies, auditing usage, and providing the information necessary to bill for services.

In some variants, authentication processes are configured to identify a client device or a user, such as by having the user enter valid credentials (e.g., user name and password) before access is granted, or other methods as described supra. The process of authentication may be based on each subscriber having a unique set of criteria or credentials (e.g., unique user name and password, challenge questions, entry of biometric data, entry of human-verification data such as "CAPTCHA" data, etc.) for gaining access to the network. For example, the AAA servers may compare a user's authentication credentials with user credentials stored in a database. If the authentication credentials match the stored credentials, the user may then be granted access to the network. If the credentials are at variance, authentication fails and network access may be denied.

Following authentication, the AAA servers are configured to grant a subscriber authorization for certain features, functions, and/or doing certain tasks. After logging into a system, for instance, the subscriber may try to issue commands. The authorization process determines whether the user has the authority to issue such commands. Simply put, authorization is the process of enforcing policies, i.e., determining what types or qualities of activities, resources, or services a user is permitted. Usually, authorization occurs within the context of authentication. Once a user is authenticated, they may be authorized for different types of access or activity. A given user may also have different types, sets, or levels of authorization, depending on any number of aspects. For instance, a given user may be authorized to access the AP and/or other network entities, operate as a network entity or node (e.g., for peer-to-peer connections), access a WNC, prevent access to the client device by other client devices.

The AAA servers may be further configured for accounting, which measures the resources a user consumes during access. This may include the amount of system time or the amount of data a user has sent and/or received during a session, somewhat akin to cellular data plans based on so many consumed or available GB of data. Accounting may be carried out by logging of session statistics and usage information, and is used for, inter alia, authorization control, billing, trend analysis, network resource utilization, and capacity planning activities. It will be appreciated that in other examples, one or more AAA servers may be linked to a third-party or proxy server, such as that of an event management entity.

In one embodiment, one or more backend interfaces 1008 are configured to transact one or more network address packets with other networked devices according to a network protocol. Common examples of network routing protocols include for example: Internet Protocol (IP), Internetwork Packet Exchange (IPX), and Open Systems Interconnection (OSI) based network technologies (e.g., Asynchronous Transfer Mode (ATM), Synchronous Optical Networking (SONET), Synchronous Digital Hierarchy (SDH), Frame Relay). In one embodiment, the backend network interface 1008 operates in signal communication with the backbone of the content delivery network (CDN), such as that of FIGS. 1-1d. These interfaces might comprise for instance GbE (Gigabit Ethernet) or other interfaces of suitable bandwidth capability.

In one embodiment, one or more network interfaces 1010 are utilized in the illustrated embodiment for communication with other network entities, e.g., client devices, AP controllers and/or other APs, such as via Ethernet or other wired and/or wireless data network protocols. In some embodiments, the AP 1000 allows irregular access to beacons. For example, if the AP enters a "sleep" mode that has disabled one or more functions including broadcasting beacons, a client device may still seek beacons (e.g., with own beacons or attempts to establish a connection) from APs known to announce beacons that carry certain information. It will also be appreciated that the two interfaces 1008, 1010 may be aggregated together and/or shared with other extant data interfaces, such as in cases where the controller entity function is virtualized within another component, such as an MSO network server performing other functions.

Figure 11:
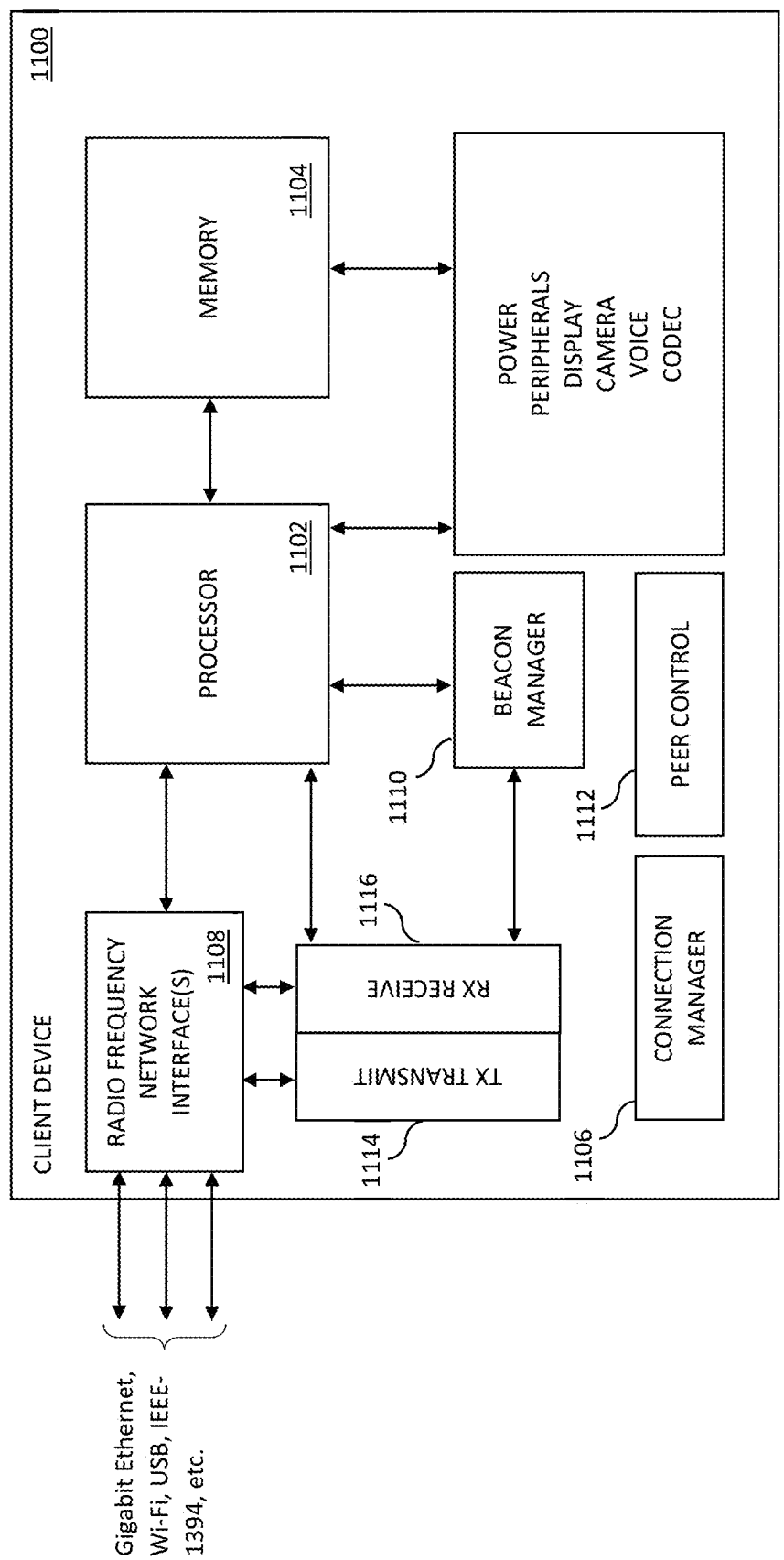
FIG. 11 is a functional block diagram of an exemplary embodiment of a client device apparatus according to the present disclosure.

FIG. 11 illustrates an exemplary wireless client device 1100 according to the present disclosure. As shown, the client device 1100 includes, inter alia, a processor subsystem 1102, a memory module 1104, connection manager 1106, one or more radio frequency (RF) network interfaces 1108, a beacon manager module 1110, a peer control module 1112, a transmit module 1114, and a receive module 1116.

In one exemplary embodiment, the processor 1102 may include one or more of a digital signal processor, microprocessor, field-programmable gate array, or plurality of processing components mounted on one or more substrates (e.g., printed circuit board). The processor subsystem 1102 may also comprise an internal cache memory. The processor subsystem is in communication with a memory subsystem 1104, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem 1102 is configured to execute at least one computer program stored in memory 1104 (e.g., a non-transitory computer readable storage medium). The computer program may include a plurality of computer readable instructions configured to perform the functions described supra, e.g., unpacking, assembly, and/or interpretation of beacons, identification of contextually relevant information from the beacons, processing of data and other delivered content, peer control management, and various assorted functions useful for and typical in consumer electronics.

In one embodiment, the beacon manager 1110 is a hardware or software module in communication with processor 1102, memory 1104 and/or receive module 1116. The beacon manager module 1110 is configured to receive beacons via a receive module 1116 and perform various functions related to interpreting the beacons (in conjunction with processor subsystem 1102 in some embodiments). For example, the beacons arriving at the client device 1100 may be out of order, fragmented, encrypted, having missing information, etc. In some embodiments, the beacon manager 1110 handles the received beacons to rearrange the beacons or determine a sequence of fragmented beacons. The beacon manager can extract information that was bit stuffed in various portions of the beacon frame. The beacon manager may also include capabilities to decrypt any encrypted beacons before unpacking the beacons and extracting information embedded therein.

In one or more embodiments, the beacon manager includes an internal cache or memory configured to hold data associated with one or more beacons. In some cases, the processor 1102 or the beacon manager 1110 may not be able to be interpret certain beacons (at least immediately). For instance, in some cases, the received beacons may have incomplete information (e.g., with respect to content fragmented across multiple subsequent beacon frames), or be encrypted or scrambled with a scheme unknown to the client device. In one variant, beacons that have shown no correlation with any known information or with other beacons may be discarded from memory immediately or after a period of time. In some embodiments, application program interfaces (APIs) such as those included in an MSO-provided mobile application or those natively available on the client device 1100 (e.g., as part of the computer program noted supra or exclusively internal to the beacon manager module 1110) may also reside in the internal cache or other memory 1104. Such APIs may include common network protocols or programming languages configured to enable communication with other network entities as well as interpretation of information embedded in the beacons (e.g., may possess decryption keys, decoding algorithms, assembly instructions for the data, etc.) that enable subsequent use by the application or other higher layer processes within the client.

In one embodiment, the radio frequency network interface 1108 is configured to transact one or more network address packets with other networked devices according to a network protocol. In particular, the network interface 1108 enables the device to receive beacons broadcasted by other network entities in the area, in accordance with the present disclosure. In one embodiment, a separate receive module 1116 is used in conjunction with the interface(s) 1108.

Network addressing may provide each node of a network with an address that is unique to that network; the address can be used to communicate (directly via peer-to-peer communications, or indirectly via a series of "hops") with the corresponding device. In more complex networks, multiple layers of indirection may be used to assist in address exhaustion (e.g., one address is logically divided into another range of network addresses). Common examples of network routing protocols include for example: Internet Protocol (IP), Internetwork Packet Exchange (IPX), and OSI-based network technologies (e.g., Asynchronous Transfer Mode (ATM), Synchronous Optical Networking (SONET), Synchronous Digital Hierarchy (SDH), Frame Relay).

A radio/modem subsystem of the client device 1100 comprises a TX transmit module 1114 and RX receive module 1116, which communicate with the RF network interface 1108. The network interface 1108 generally incorporates an assembly of filters, low noise amplifiers (LNAs), power amplifiers (PAs), and antenna assemblies that are configured to transmit a modulated waveform via an air interface. As shown, the radio/modem subsystem may be configured to support MIMO (multiple input, multiple output) antenna technology in which multiple antennas are used to transmit and receive signaling. With MIMO, multiple independent data streams can be transmitted in parallel using the same time-frequency resource. To distinguish the data streams sharing this same time-frequency resource, spatial division multiplexing is applied. Those of ordinary skill in the related arts will readily appreciate that SISO (single in, single out), SIMO (single in, multiple out), and MISO (multiple in, single out) antenna schemes may be substituted with equivalent success.

The client apparatus 1100 of the present disclosure is primarily directed to mobile consumer electronics devices, such as, but not limited to mobile devices such as handheld computers, PDAs, personal media devices (PMDs), smartphones, tablets, and "phablets," vehicle infotainment or similar systems, and personal computers (PCs), and minicomputers, whether desktop, laptop, or otherwise. Artisans of ordinary skill will readily appreciate that consumer electronics devices may incorporate various other assorted components necessary to support typical functions of such devices, including power modules, peripherals modules, display modules (associated with, e.g., a display screen, UI, GUI), camera modules, voice codec modules, etc.

Alternate Embodiments

While the foregoing examples and implementations are described explicitly in the context of beacon frames transmitted from e.g., a Wi-Fi (802.11) enabled access point (AP), other modalities for delivery of "stuffed" information (and/or for upstream communication, if utilized) will be recognized by those of ordinary skill given the present disclosure.

As one example, as is known, so-called "Wi-Fi Direct" enabled devices can communicate in a peer-to-peer (P2P) fashion, irrespective of an AP. Once one of the peers has been designated "Group Owner" (GO), beacons of the type previously described herein are transmitted by the GO. Hence, the present disclosure contemplates both that (i) one STA or peer (e.g., mobile device) can communicate bit-stuffed beacons to one or more other of the peers, irrespective of any fixed AP or other network connectivity, such as where the MSO app running on the GO contains routines to stuff beacons that its host device transmits similar to the APs described above; and (ii) that two or more mobile devices can "ladder" or "daisy chain", thereby extending delivery of the stuffed content beyond a given single device (e.g., one in wireless range of an AP or GO). For example, consider the case where a Wi-Fi Direct enabled mobile device (e.g., smartphone) of an MSO subscriber that is equipped with the aforementioned application program (the latter which can both extract stuffed bits from beacons, and stuff bits for transmission in its beacons as with the AP) receives one or more content elements (e.g., coupon) from an AP while in proximity thereto. After the smartphone of that user dissociates from the providing AP, it later encounters another smartphone of another MSO subscriber (whether incidentally or intentionally or otherwise), this other smartphone also having the aforementioned MSO app operative thereon and being Wi-Fi Direct capable. The two smartphones execute the P2P protocols according to Wi-Fi Direct operation, and one of the peers is designated as GO (here, the first smartphone). That peer then utilizes the MSO app to stuff its beacons with the content element received previously from the AP, thereby passing the coupon on to the second MSO subscriber. This approach in effect allows the coupon (or EAS message or text or picture or whatever) to propagate within at least the population of mobile device users who are MSO subscribers and who have downloaded the MSO app. Such propagation can be permissive or "open" (such as by corollary in Bluetooth pairing); in the latter option, any MSO subscriber phone or mobile device incidentally or otherwise encountering another MSO device with its association permissions disabled can immediately propagate the content element to others, and so forth.

Likewise, two STAs under 802.11 can communicate via so-called "probe requests" and "probe responses". Such probe requests have facility for inclusion of various types of information, including e.g., one or more "vendor specific" elements disposed at the end of the frame (see e.g., IEEE Std. 802.11-2012 and 2013 (802.11ac)). Probe request frames also may include "Request Information" elements. Similarly, probe responses can contain multiple types of information, including the aforementioned "requested information" in the probe request frame. Hence, the present disclosure contemplates use of other types of frames, whether alone or in conjunction with beacon frames, for transferring information between two or more Wi-Fi enabled devices.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A method of providing a dynamic open-access network to a wireless-enabled client device via an access point, the access point comprising wireless data communication capability, the method comprising:
   receiving, at the access point, from a centralized manager entity, information related to a location of the access point, the received information being selected by the centralized manager entity based at least on the location of the access point and comprising information relating to one or more predetermined areas of interest associated with the location of the access point;
   packaging, at the access point, at least predefined segments of the information related to the location of the access point into successive ones of a plurality of beacons, the packaging of the plurality of beacons preserving an order associated with the predefined segments;
   wirelessly broadcasting, from the access point, the plurality of beacons comprising the at least the predefined segments of the information related to the location so as to enable at least the wireless-enabled client device to detect one or more of the wirelessly broadcast plurality of beacons when the wireless-enabled client device is within wireless range of the access point; and
   responsive to a determination by the access point that at least one of the plurality of beacons has been detected by the wireless-enabled client device:
   establishing, via at least the access point, a wireless data connection with the wireless enabled client device; and
   providing, to the wireless-enabled client device via the established wireless data connection, digitally rendered content related to the at least the predefined segments of the information related to the location of the access point.

2. The method of claim 1, wherein the beacon frames comprise IEEE Std. 802.11 beacon frames and the packaging of the at least the predefined segments of the information comprises bit stuffing the at least the predefined segments of the information related to the location.

3. The method of claim 2, wherein the at least predefined segments of the information related to the location comprises at least one service set identifier (SSID) advertising an access point to at least the wireless-enabled client device.

4. The method of claim 1, wherein the packaged at least predefined segments of the information related to the location of the access point comprises information relating to a geographic location associated with the wireless-enabled client device.

5. The method of claim 1, wherein the acts of receiving, packaging and broadcasting are performed by the wireless-enabled access point, the wireless-enabled access point being operative to communicate with at least the wireless-enabled client device using the wireless technology, and the packaging comprises disposing the at least the predefined segments of the information in a format such that it can be extracted by at least the wireless-enabled client device without any response by the wireless-enabled client device.

6. The method of claim 1, further comprising, when at least one given data structure of the plurality of beacon frames is acknowledged by the wireless-enabled client device, associating the wireless data connection with the wireless-enabled client device.

7. The method of claim 6, further comprising providing the wireless-enabled client device with additional content via the associated connection.

8. The method of claim 7, wherein the additional content is contextually relevant to the received information.

9. The method of claim 6, wherein the at least one given data structure is specific to a user of the client device.

10. The method of claim 1, wherein the received information comprises information relating to one or more emergency conditions.

11. The method of claim 1, wherein the predefined segments comprise an indicia of the order associated therewith, the packaging in successive ones of beacon frames including inserting the indicia of order for each of the segments in its respective beacon frame.

12. The method of claim 1, further comprising: causing the wireless-enabled client device to extract the at least predefined segments portion of the information related to the location of the access point upon receipt by the wireless-enabled client device of at least one of the wirelessly broadcasted plurality of beacons comprising the at least the predefined segments of the information related to the location of the access point; and
   wherein the receiving of the information related to the location of the access point comprises receiving information that is geographically and commercially relevant to a user of the wireless-enabled client device, the wireless-enabled client device being serviced by the wireless-enabled access point, the wireless-enabled access point being configured to wirelessly broadcast the plurality of beacons
   comprising the at least predefined segments of the information related to the location of the access point; and
   wherein the packaging of the at least predefined segments of the information related to the location into a plurality of beacon frames comprises inserting the at least predefined segments of the information into a data field of the plurality of beacon frames separate from data fields containing data representative of network parameters related to the dynamic open-access network.

13. An apparatus for use within a dynamic open-access network, the apparatus comprising:
   a wireless interface;
   a processor apparatus in data communication with the wireless interface; and
   a non-transitory computer-readable storage apparatus in data communication with the processor apparatus and comprising one or more computer programs, the one or more computer programs comprising a plurality of instructions configured to, when executed on the processor apparatus, cause the apparatus to:

receive, from a substantially centralized network entity, first information associated with at least a location associated with the apparatus, the first information being selected by the substantially centralized network entity based at least on the location the apparatus to include information relating to one or more predetermined areas of interest associated with the location associated with the apparatus;

generate wirelessly transmissible beacons, the wirelessly transmissible beacons each comprising at least predefined segments of the received first information packaged into successive beacon frames in an order associated with the predefined segments; and wirelessly transmit the wirelessly transmissible beacons directly to a wireless recipient device via the wireless interface of the apparatus;

wherein the receipt of the first information associated with the at least location associated with the apparatus relates to at least one concurrent event within a wireless range of the wireless interface of the apparatus.

14. The apparatus of claim 13, wherein the plurality of instructions are further configured to, when executed on the processor apparatus: receive subsequent information relating to the at least location of the associated with the apparatus; insert at least a portion of the subsequent information into one or more beacon frames of one or more additional beacons; and wirelessly transmit the one or more additional beacons; wherein the subsequent information is configured to be useful to the wireless recipient device to modify at least predefined segments of the first information previously received thereby.

15. The apparatus of claim 13, wherein the plurality of instructions are further configured to, when executed on the processor apparatus, cause the apparatus to: determine the at least location associated with the apparatus to be relevant to the apparatus, the determination of being relevant to the apparatus comprises association of the location of the apparatus to that of one or more events being conducted contemporaneously with the receipt of the first information by the apparatus.

16. The apparatus of claim 13, wherein the plurality of instructions are further configured to, when executed on the processor apparatus, cause the apparatus to: determine the at least location associated with the apparatus to be relevant to the apparatus, the determination of being relevant to the apparatus comprises association of the location of the apparatus to that of one or more network subscribers contemporaneously with the receipt of the first information by the apparatus.

17. A non-transitory computer-readable apparatus comprising a storage medium having at least one computer program comprising a plurality of instructions, the plurality of instructions being configured to, when executed by a processor apparatus disposed within a wireless-enabled apparatus, cause the wireless-enabled apparatus to:

receive digital contextual data related to a location of the wireless-enabled apparatus from at least one computerized apparatus, the received digital contextual data being selected by the at least one computerized apparatus based on the location of the wireless-enabled apparatus and comprising information relating to one or more predetermined areas of interest associated with the location of the wireless-enabled apparatus;

package at least predefined segments of the digital contextual data into a portion of each of successive ones of a plurality of beacons, the packaging of the plurality of beacons preserving an order associated with the predefined segments; and wirelessly broadcast the plurality of beacons, the wireless broadcast enabling the one or more wireless-enabled client devices within a wireless range of the wireless-enabled apparatus to (i) detect the broadcasted plurality of beacons, (ii) extract the at least predefined segments of the digital contextual data from the portion of each of the plurality of beacons, and (iii) establish a direct wireless data connection with the wireless-enabled apparatus based on the extracted at least predefined segments of the digital contextual data.

18. The non-transitory computer-readable apparatus of claim 17, wherein: the plurality of beacons comprise IEEE Std. 802.11 beacons; the portion of each of the plurality of beacons comprises at least one beacon frame; and the packaging of the at least the predefined segments of the digital contextual data comprises bit stuffing the at least the predefined segments of the digital contextual data.

19. The non-transitory computer-readable apparatus of claim 18, wherein each of the at least one beacon frame comprises (i) a plurality of first fields configured to contain at least data representative of network parameters and (ii) a variable-length frame body, the variable-length frame body comprising a subset of fields configured to contain information elements, at least a portion of the information elements comprising the at least the portion of the digital contextual data.

20. The non-transitory computer-readable apparatus of claim 17, wherein the at least predefined segments of the digital contextual data comprise a service set identifier (SSID) advertising an access point to the one or more wireless-enabled client devices, the wireless-enabled apparatus comprising the access point.

21. The non-transitory computer-readable apparatus of claim 17, wherein the plurality of instructions are further configured to, when executed by the processor apparatus, cause the wireless-enabled apparatus to: automatically determine whether at least one of the wirelessly broadcasted plurality of beacons is detected by at least one of the one or more wireless-enabled client devices; establish a dedicated data session with the at least one of the one or more wireless-enabled client devices based on the digital contextual data contained in the at least one of the broadcasted plurality of beacons; and provide digital data to the at least one of the one or more wireless-enabled client devices via the established data session.

22. The non-transitory computer-readable apparatus of claim 21, wherein the automatic determination of the detection comprises receipt of return data message issued by the at least one of the one or more wireless-enabled client devices.

23. The non-transitory computer-readable apparatus of claim 17, wherein the broadcast further enables the one or more wireless-enabled client devices to: identify the at least predefined segments of the digital contextual data, the digital contextual data comprising information relevant to a location to the one or more wireless-enabled client devices; establish a data connection with the at least one computerized apparatus, the at least one computerized apparatus comprising one or more of: (i) a centralized manager entity, (ii) an access point, and (iii) a wireless-enabled client device; receive digital data from the at least one computerized apparatus via the established data connection.

\* \* \* \* \*